US006964025B2

(12) United States Patent
Angiulo et al.

(10) Patent No.: US 6,964,025 B2
(45) Date of Patent: Nov. 8, 2005

(54) AUTO THUMBNAIL GALLERY

(75) Inventors: Michael A. Angiulo, Redmond, WA (US); Benjamin E. Canning, Redmond, WA (US); Zhenguang Chen, Seattle, WA (US); Charles W. Parker, Redmond, WA (US); Lou Nell Gerard, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 09/813,515

(22) Filed: Mar. 20, 2001

(65) Prior Publication Data
US 2002/0135621 A1 Sep. 26, 2002

(51) Int. Cl.[7] .................................. G06F 3/00
(52) U.S. Cl. ............... 715/838; 715/760; 715/763; 715/769
(58) Field of Search .................. 715/730–732, 715/760, 762–765, 769, 810, 835, 838

(56) References Cited

U.S. PATENT DOCUMENTS 6,675,354 B1 * 1/2004 Claussen et al. ............ 715/513
6,684,369 B1 * 1/2004 Bernardo et al. ............ 715/513

OTHER PUBLICATIONS

Arles Image Web Page Creator Version 2.1. Jan Derk Stegeman. Copyright 1999. Screenshots and Helpfile.*
Arles Image Web Page Creator. Digital Dutch. Aug. 17, 2000. http://web.archive.org/web/20000817091643/digitaldutch.com/arles/.*
Web Album Creator. Galleria Software. Jan.–Feb. 2001. http://web.archive.org/web/20010108153400/www.galleria-software.com/mainframe.htm.*

* cited by examiner

Primary Examiner—John Cabeca
Assistant Examiner—Brian J. Detwiler
(74) Attorney, Agent, or Firm—Ronald M. Anderson

(57) ABSTRACT

A tool that enables a user to easily and automatically create a photo gallery of thumbnail images on a Web page. A user selects a group of original images, and the tool automatically produces a corresponding group of thumbnail images on the Web page, with hyperlinks to the corresponding original images. Four predefined templates are included, each defining a different format for the thumbnail images including a vertically oriented gallery, a horizontally oriented gallery, a slide show gallery, and a montage gallery. Captions and descriptive text can also be entered and displayed for the thumbnail images in most of the style galleries. An edit function enables a user to add or delete images to existing galleries and to automatically modify the appearance of a photo gallery by selecting and applying a different template.

49 Claims, 10 Drawing Sheets

AUTO THUMBNAIL GALLERY

FIELD OF THE INVENTION

The present invention generally relates to inserting a gallery of images into a document that is accessed over a network, and more specifically, to the automated inclusion of a gallery of reduced-size or "thumbnail" images representing larger images in a Web page that will be accessible over the Internet or other network, so that the thumbnail images are arranged in a desired format, any of the original larger images being accessed and displayed in the Web page by selecting the thumbnail image corresponding to the original image.

BACKGROUND OF THE INVENTION

Typically, Web page's full-size photos or other graphic images are not included in a Web page because most Internet users are limited to relatively slow network connections, such as a modem connected to the Internet over a Plain Old Telephone Service (POTS) line, operating at speeds less than 56 Kbits/sec. Graphically intensive Web pages generally do not load within a reasonable period of time (i.e., less than a minute) for users connected to the Internet through such a modem. Since images are a popular medium of expression in Web pages, there has been a conflict between the desire to incorporate image content in Web pages, and the need to limit the amount of data that must be transmitted per Web page, to reduce the time required to load a Web page. One popular method of including images in Web pages while reducing the amount of data that must be transferred for each page is to include small images or thumbnail images in the Web page, each thumbnail image representing a corresponding larger image. Since the amount of data required in a Web page for displaying an image is directly proportional to the number of pixels in the displayed image, any reduction in the size of an image included in a Web page causes a corresponding decrease in the amount of data that must be downloaded by the user for viewing the image. A thumbnail image created from an original (full size) image typically conveys sufficient information so that a person viewing the thumbnail image can visually determine the content of the original image. Thus, Web pages that display thumbnail images instead of the original larger images download more quickly and still communicate the desired graphic content to the user.

Each thumbnail image is hyperlinked to its parent original image. By selecting the thumbnail image (generally by using a pointing device such as a mouse to position a cursor on the thumbnail image and then double clicking with the select button), the original image will be transferred to the user's browser program so that the user can readily view the original image if desired. By viewing the thumbnail images, the user can select and download only those original images that are of particular interest.

In the prior art, if a user is creating or editing an existing Web page and wants to insert a thumbnail image to represent a larger image, several manual steps are required. It is necessary for the user to first produce the thumbnail image using an image editing program, insert the thumbnail image into the Web page, and then associate a hyperlink back to the original larger image from the thumbnail image so that when the thumbnail image is selected by someone viewing the Web page, the full size original image will be retrieved and displayed. This process must be repeated for each individual image included. Microsoft Corporation's FRONTPAGE 2000™ Web page creation and editing software has automated the insertion of individual thumbnail images, so that the user can more readily insert a thumbnail image representing a larger original image into a Web page. However, many individuals who wish to create a personal Web page will want to include a plurality of images, such as pictures related to a wedding, a graduation, a vacation, or some other event that is important in their life, e.g., producing a photo gallery of the event.

When creating Web pages, especially Web pages that incorporate a considerable amount of content such as thumbnail images hyperlinked to original parent images, the file management and structural organization required can be challenging, particularly for the casual user. It would be desirable to not only provide tools to save repetitive steps required when incorporating thumbnail images into Web pages, but to also provide tools that automatically introduce some structure and organization into an otherwise flat process.

Clearly, it would be desirable to enable a plurality of images to be incorporated into a Web page as thumbnail images in a single operation, rather than requiring each image to be added individually through a series of manual steps, or even as an automated process that must be repeated for each image. It would also be desirable to provide a plurality of user-friendly templates that automatically define several different formats for a plurality of thumbnail images on a Web page, so that a casual user can easily create an aesthetically-pleasing gallery of thumbnail images with a minimum of effort. The prior art does not teach or suggest such a tool.

SUMMARY OF THE INVENTION

The present invention defines a method for enabling a user to automatically and simultaneously introduce a plurality of thumbnail images into a Web page to produce a gallery of the thumbnail images. The thumbnail images represent a corresponding plurality of original images, and each thumbnail image is substantially smaller than its corresponding original image. The method includes the step of enabling a user to select a plurality of original images that are to be represented by the thumbnail images. A thumbnail image is automatically produced from each original image selected, and a formatting template is used to determine the relative position of each thumbnail image on a Web page. A hyperlink linking each thumbnail image to its corresponding original image is automatically provided, in the Web page. Finally, a user is enabled to save the Web page that includes the plurality of thumbnail images and the hyperlinks. Each thumbnail image appears when the Web page is displayed, and each hyperlink enables the corresponding original image to be retrieved and displayed if a thumbnail image is selected and the hyperlink for the thumbnail image that was selected is activated.

Preferably, a user is enabled to select from among a plurality of different templates that define the format and layout of the thumbnail images on the Web page. The selected template is used to generate a Web page that includes the plurality of thumbnail images and each hyperlink in the format and layout defined by the template. The plurality of templates preferably include a vertically oriented template, a horizontally oriented template, a slide show oriented template, and a montage template. Alternatively, a user can define a custom template, save the custom template, and select the custom template, rather than selecting one of the plurality of templates that is provided. Preferably, the templates are defined using extensible style language. In at least one embodiment, each template includes at least one default parameter. The default parameter can define a number of thumbnail images per row of the template, a height of each thumbnail, a width of each thumbnail, a title of the template, a description of the template, a preview image file name, and indicate any dependent files relating to the template.

When a selected template is used to generate a Web page, the present invention preferably creates a data manifest for the Web page, in extensible markup language (XML). The data manifest includes at least thumbnail image data and hyperlink data. Once the data manifest is created, it is saved, and an extensible style language file that corresponds to the selected template is loaded. The method uses the data manifest and the extensible style language file that corresponds to the selected template to generate a hypertext markup language (HTML) file for the Web page.

In one embodiment, the step of creating a data manifest in XML includes the steps of including a file-width attribute, a file-height attribute, and thumbnail image attributes such as a thumbnail height and a thumbnail width. In another embodiment, the step of creating a data manifest in XML incorporates including at least one of a file attribute, a caption element, and a description element.

Another feature of the present invention is enabling a user to edit a gallery of thumbnail images. In at least one embodiment, after the step of using the template that was selected to generate the Web page, but before saving the Web page, a user is enabled to view a preview and edit the Web page. The edit function enables a user to select a different one of the plurality of templates than previously selected, and in response, the present invention automatically generates a revised Web page that includes the plurality of thumbnail images and their hyperlinks displayed according to a format provided by the different template. The user then can view the edited Web page, and either continue editing or save the edited Web page.

Preferably, the edit function also enables a user to select an individual thumbnail to edit or delete, and to select one or more additional original images that will be represented by corresponding additional thumbnail images in the gallery on the Web page. When adding one or more original images, the present invention automatically generates a corresponding thumbnail image for each additional original image selected, provides a hyperlink between the thumbnail image and corresponding additional original image, and then adds the hyperlink and the thumbnail image to the gallery on the Web page. A user can drag and drop the one or more additional original images onto the gallery on the Web page to indicate the selection. When editing a thumbnail image, a user can resize the thumbnail image, crop it, rotate it, add a caption relating to the thumbnail image, delete an existing caption relating to the thumbnail image, or modify an existing caption relating thereto.

The step of selecting the original images that are to be represented by the plurality of thumbnail images can include the step of importing one or more image files from a storage device, importing one or more images from a scanner, and/or importing one or more images from a digital image capturing device.

The method of the present invention further preferably includes the step of enabling a user to link Web pages that each include a gallery of thumbnail images together. In at least one embodiment, a user links individual Web pages together by adding a navigation bar to each Web page.

Other aspects of the present invention are directed to a system for automatically producing a gallery of thumbnail sized images on a Web page, from a plurality of original images selected by a user, and to an article of manufacture including a computer-readable memory medium having computer-executable machine instructions that when executed by a processor, cause it to enable a user to automatically generate a gallery including a plurality of thumbnail images on a Web page, by selecting a plurality of original images. In both of these aspects of the present invention, the functions implemented are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 3:
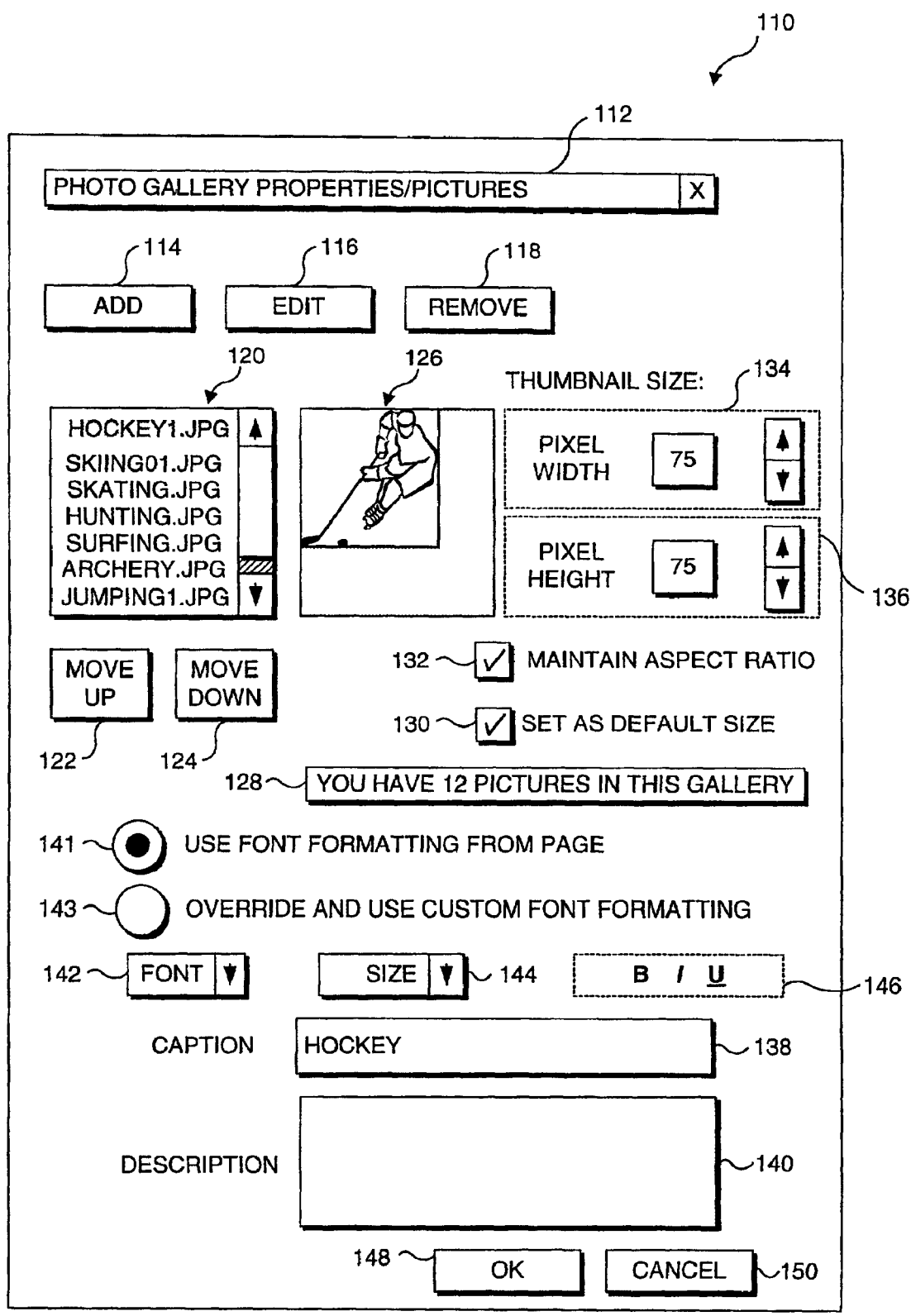
FIG. 3 is an exemplary Dialog box that is provided to enable a user to select a plurality of original images from which corresponding thumbnail images will be automatically provided for use in a photo gallery on a Web page.
Figure 9:
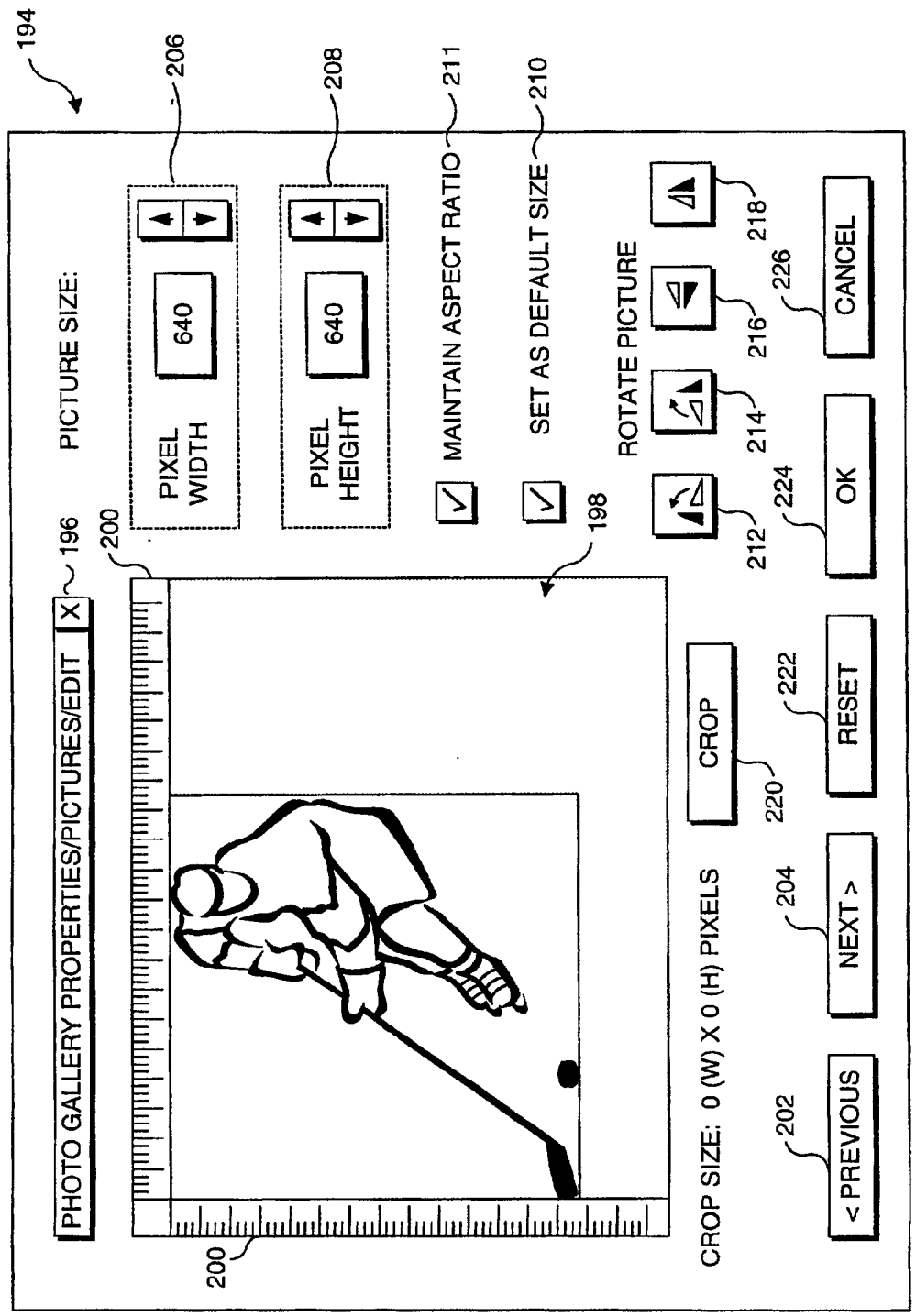
Figure 10:
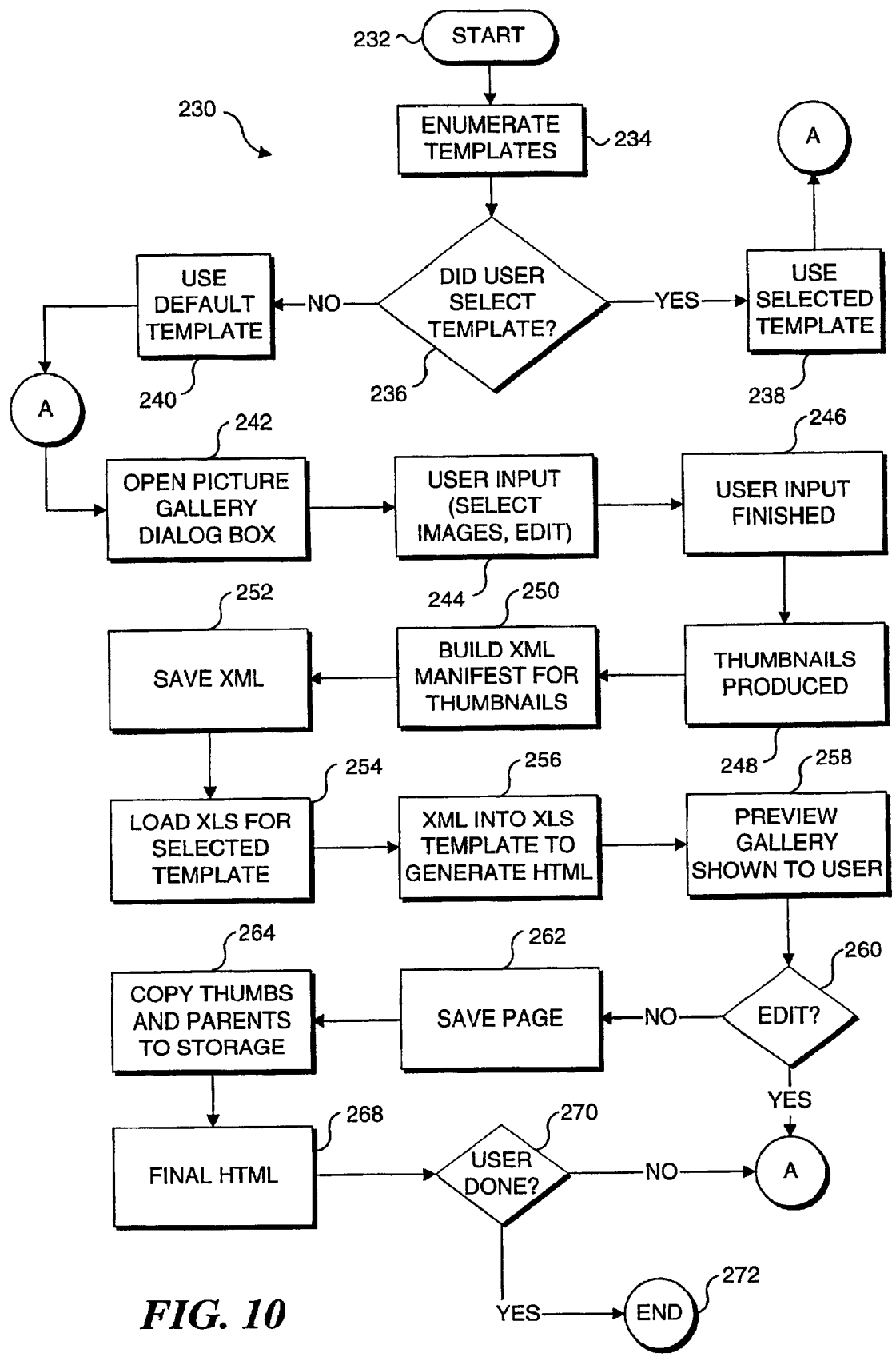

FIG. 9 is an exemplary Dialog box that is provided to enable a user to selectively edit a plurality of original images selected in the exemplary Dialog box of FIG. 3; and FIG. 10 is a flow chart that illustrates the logical steps implemented by software instructions in producing a photo gallery of thumbnail images, each corresponding to a user selected original image, and displayed in a format determined by a predefined photo gallery template, in accord with the present invention.

DESCRIPTION OF THE PREFERRED EMBODIMENTS

A preferred embodiment of the present invention will be included in an updated version of FRONTPAGE 2000™, a Web page authoring and editing application, which will be distributed by Microsoft Corporation, under the tentative name of FRONTPAGE 2002™. As implemented therein, the present invention will enable a user to automatically produce a photo gallery of thumbnail (sized) images on a Web page by selecting a group of original images. A user is also able to select from among a plurality of different predefined templates, each template defining a format or layout for a different style photo gallery.

For each image, the present invention automatically generates a small thumbnail image and creates a hyperlink connection to the substantially larger parent original image. Each thumbnail image is inserted into a Web page according to the formatting information in the selected template. Thus, the present invention obviates the need for the user to manually or even automatically, produce and incorporate each thumbnail image into a Web page individually, as well as obviating the need for the user to manually format the Web page to determine the relative position of each thumbnail on the Web page.

Exemplary Operating Environment

Figure 1:
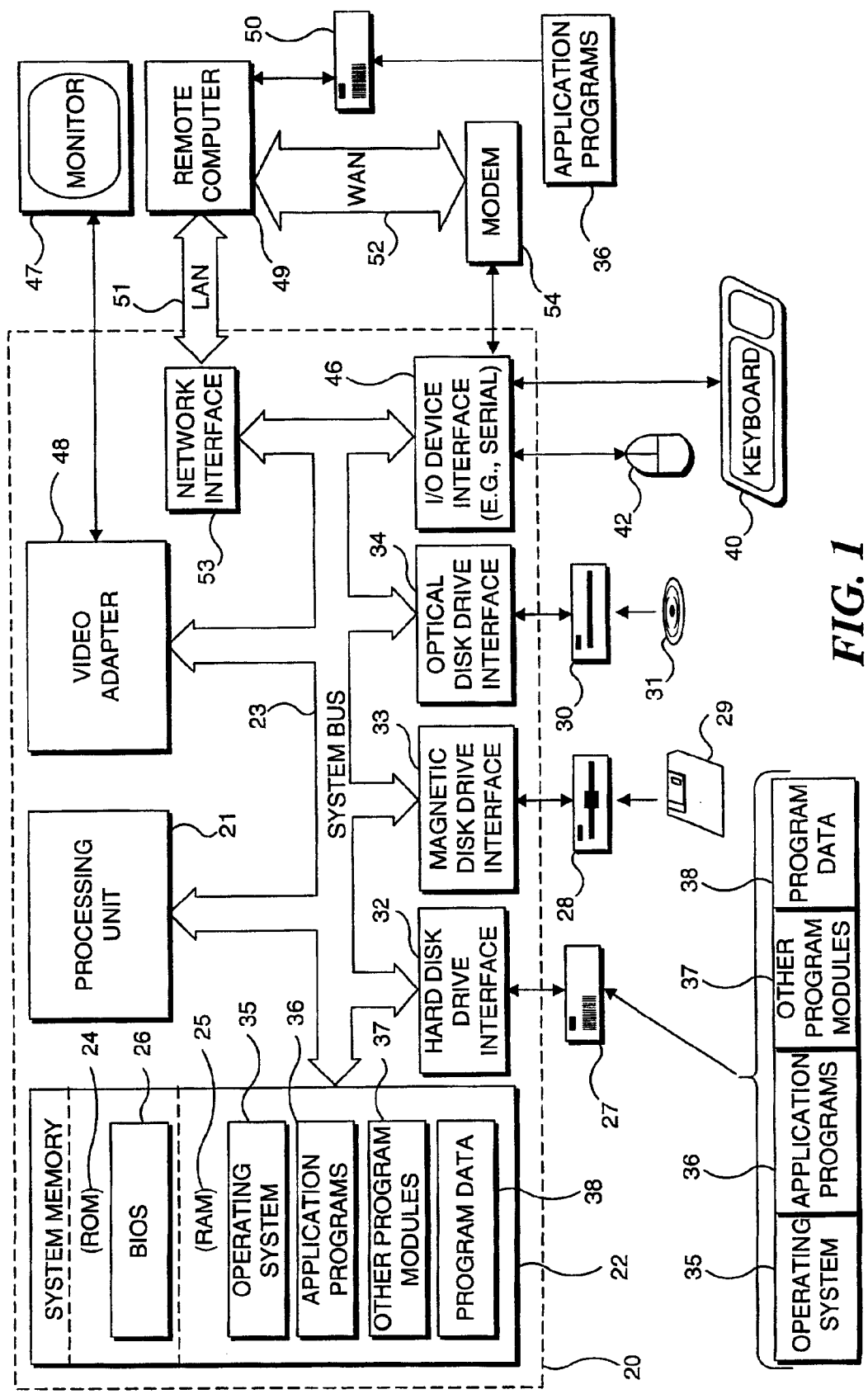
FIG. 1 is an exemplary block diagram of a typical personal computer suitable for implementing the present invention.

FIG. 1 and the following discussion are intended to provide a brief, general description of a suitable computing environment in which the present invention may be implemented, by executing machine instructions, such as program modules, on a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronic devices, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components, including the system memory, to processing unit 21. System bus 23 may be any of several types of bus structures including a memory bus or memory controller, a peripheral bus, and a local bus using any of a variety of bus architectures. The system memory includes a read only memory (ROM) 24 and a random access memory (RAM) 25. A basic input/output system (BIOS) 26, containing the basic routines that helps to transfer information between elements within personal computer 20, such as during start-up, is stored in ROM 24. Personal computer 20 further includes a hard disk drive 27 for reading from and writing to a hard disk (not individually shown), a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for personal computer 20. Although the exemplary environment described herein employs a hard disk, removable magnetic disk 29, and removable optical disk 31, it should be appreciated by those skilled in the art that other types of computer readable media, which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through a serial port interface 46 that is coupled to the system bus, but may be connected by other interfaces, such as a parallel port, game port, or a universal serial bus (USB). A monitor 47 or other type of display device is also connected to system bus 23 via an interface, such as a video adapter 48. In addition to the monitor, the personal computer may include other peripheral output devices (not shown), such as speakers and printers.

Personal computer 20 may operate in a networked environment using logical connections for communicating with one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, personal computer 20 is connected to local network 51 through a network interface or adapter 53. When used in a WAN networking environment, personal computer 20 typically includes a modem 54 or other means for establishing communications over WAN 52, and over the Internet. Modem 54, which may be internal or external, is connected to system bus 23 via serial port interface 46. In a networked environment, program modules depicted relative to personal computer 20, or portions thereof, may be stored in the remote memory storage device. It will be appreciated that the network connections shown are exemplary and other means of establishing a communications link between the computers may be used.

Before explaining how the features of the present invention are implemented, it will be helpful to define several terms. The term "HTML document" as used herein means a file that includes HTML content, which is intended to be viewed or displayed with a Web browser. The term "original image" as used herein and in the claims that follow means a digital image whose size has not been reduced specifically for the purpose of minimizing an amount of data required to render the image. Note that an original image does not mean that such an image is life size, that such an image is not itself a duplicate of some other image, or that such an image has never undergone any manipulation (including a reduction in size) from another image. Instead, an original image is simply an image whose size in pixels is sufficiently great to justify not including it on a Web page unless it is selected for display by a recipient.

Generally, multiple original images are not simultaneously displayed on a Web page because of the required data transfer and sometimes, because they would not fit on a single screen of the recipient's display. In contrast, a "thumbnail image" is an image whose size has been reduced to significantly minimize the number of bytes required to render the thumbnail image, even to a point of eliminating some desirable detail. Thumbnail images need only be sufficiently detailed to provide a viewer sufficient visual information concerning the content of the original image, such as to enable the viewer to decide whether to view the corresponding original image. Generally, thumbnail images (as the name suggests) are approximately the size of an individual's thumbnail, though the actual size of thumbnail images can vary depending on specific applications, size of a user's display screen, size of a browser window, and display preferences. In any event, significantly more thumbnail images can fit on a typical Web page than can original images.

The following example of a preferred embodiment of the present invention is disclosed in regard to its use in a Web page authoring program; however, it is not intended that the invention be limited to that application, since it can be clearly applied to other types of HTML related applications. For example, a user might wish to generate photo galleries for archival purposes, rather than for publishing the photo galleries in a Web page on the Internet. Or rather than being incorporated into a Web authoring and management application, the present invention might be incorporated in software provided with and relating to the use of a digital camera, or within a suite of related applications, some of which are unrelated to Web page authoring tools. While it is understood that it is preferable to use a trademark such as FRONTPAGE 2002™ as an adjective in connection with the type of product to which the present invention is applied, for simplicity, all further references to this program in the following description will simply refer to this application as "FRONTPAGE 2002," omitting reference to the term "Web authoring and editing application" and the "™" symbol.

HTML is a relatively simple language used to create hypertext documents that are portable from one computer platform to another and generally not dependent upon a specific operating system. HTML provides the core structure and format of documents accessible via the Internet. XML describes a class of data objects that can both define a type of data and convey the data to computers on a network, such as the Internet. XML documents can be stored, distributed, and displayed. XML is a subset or restricted form of SGML, the Standard Generalized Markup Language (ISO 8879), but as the name implies, is extensible without limit. The goal of XML is to enable generic SGML to be served, received, and processed on the Web or other network in a way that is not possible with HTML. XML has been designed for ease of implementation and for interoperability with both SGML and HTML and customizes SGML in a number of significant ways. First, a specific choice of syntax characters was made by the specification designers so that everyone using XML will use the same well-defined syntax. For example, all start tags used to identify elements of an XML file must begin with "<" and end with ">". Second, a new "empty-element" tag may be used to indicate that there is an empty element and that an end tag is not expected. This new empty-element tag is like a start tag with a slash character just before the closing greater-than angle bracket, i.e., "/>". Third, tag omission is not allowed, so that each non-empty element will have both a start tag and an end tag. XML was developed by the SGML Editorial Board formed under the auspices of the World Wide Web Consortium (W3C) beginning in 1996. The XML specification can be found by linking to http://www.w3.org/TR/1998/REC-xml-19980210 on the Internet.

In a preferred embodiment of the present invention, a newer version of the XML language is employed. This "newer" version is XML Schema. The XML Schema specification can be found by linking to http://www.w3.ord/TR/xmlschema-0/ on the Internet. The purpose of a schema is to define a class of XML documents, and so the term "instance document" is often used to describe an XML document that conforms to a particular schema. In fact, neither instances nor schemas need to exist as documents per se—they may exist as streams of bytes sent between applications, as fields in a database record, or as collections of XML Infoset "Information Items".

Extensible style language (XSL) is a style language that is targeted at XML, in particular to highly-structured, data-rich documents that require extensive formatting. XSL uses an XML notation, and is primarily intended for complex formatting where the content of the document might be displayed in multiple places. For example, the text of a heading might also appear in a dynamically generated table of contents. Once XSL has been applied to an XML document, an HTML document can be generated that maintains the desired formatting, and that can be readily viewed by a web browser.

Note that some characters are "special" to XSL, in that the standard Unicode definition does not always apply to XSL. Unicode is a 16-bit character code standard (also known as ISO 10646), which is intended to provide character codes for all the world's written languages. For example, the Unicode character for the Japanese Yen sign (¥) is #a5. In XSL, the ampersand sign (&) and the left angle bracket sign (<) must be treated as "foreign" characters. Further details regarding XSL may be found at the W3C web site. The following HTML document, available on the Internet, represents the W3C's recommended standard for XSL: http://www.w3.org/Style/XSL/.

The present invention makes use of HTML, XML, and XSL. In brief, once a user has selected a group of images, the present invention generates a thumbnail image corresponding to each original image that was selected, and a hyperlink connecting each thumbnail image to its original parent image. A data manifest is then generated using XML. The XML data manifest includes all data relating to the thumbnail images and the hyperlinks to the parent original images. The present invention then retrieves the default (or a selected) photo gallery template, which is an XSL file. A transform is executed to convert the XML data manifest into HTML, using the formatting data contained in the XSL style sheet for the template. The HTML can then be accessed by a Web browser and viewed as a Web page that contains a thumbnail photo gallery. Preferably the present invention employs the MSXML parser, developed by the Microsoft Corporation, to manipulate XML data. It should be noted that other XML parsers could be similarly utilized.

Figure 2:
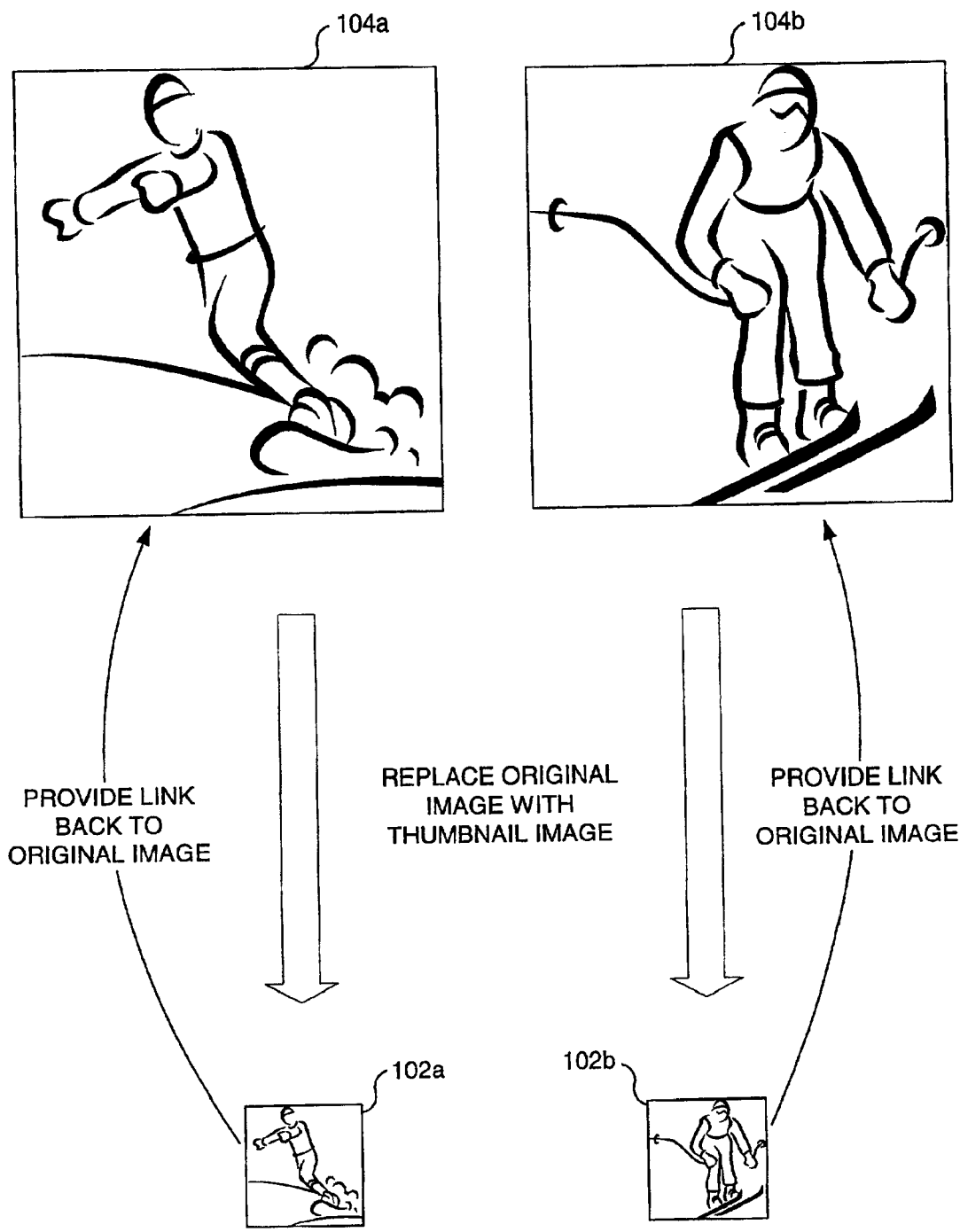
FIG. 2 is a schematic diagram showing an exemplary group of original images and thumbnail-sized reproductions of each original image, illustrating the functionality of the present invention.

FIG. 2 illustrates the functionality of reproducing thumbnail (small size) images 102a and 102b from original images 104a and 104b, so that the original images are represented by the thumbnail images, and so that each thumbnail image has associated with it a hyperlink to the original image. The selection of either thumbnail image 102a or 102b in a Web page causes the associated hyperlink to be activated, resulting in the retrieval and display of the corresponding original image 104a or 104b. A user simply selects a group of original images and a photo gallery template, and FRONTPAGE 2002 will automatically generate a Web page containing a photo gallery conforming in format to the selected photo gallery style. Several photo gallery templates will be included in FRONTPAGE 2002, each capable of automatically producing a different style photo gallery. This photo gallery generating feature of FRONTPAGE 2002 will be selectable as a menu item entitled "Photo Gallery Properties" in a Web page editing and authoring module provided in that program. Typically, the user will select the photo gallery menu item, source of original images, and then select both a group of original images, and the desired photo gallery template. Note that the original images can be present in an existing Web page (i.e., stored in a directory on the hard drive of the server on which the Web page is accessed, or stored on hard drive(s) in one or more other computers accessible over a network), in a hard drive or other memory media on a user's own computer, or imported from an external device such a scanner, digital camera, or other digital image capturing device. It should be noted that the present invention is not limited to inclusion only in a Web page editor, but instead, could be included with other application programs or provided as a stand-alone program, or provided as a plug-in tool for use with other editor and/or authoring programs.

Turning now to FIG. 3, a Dialog box 110 is shown. Preferably, Dialog box 110 is displayed once a user selects a pictures tab from a Main Photo Gallery Properties menu (not separately shown). A text box 112 alerts a user that Dialog box 110 relates to Photo Gallery Properties/Pictures. Dialog box 110 displays a plurality of options that may be selected by a user for controlling various parameters of the thumbnail images (e.g., thumbnail images 102a and 102b) that a user wants to provide in a photo gallery on a Web page, to represent a group of original images selected by the user. An Add control 114 is available to enable a user to indicate a desire to add thumbnail images to a photo gallery on a Web page, an Edit control 116 opens a dialog box that enables a user to edit the original image from which a selected thumbnail image was derived, while a Remove control 118 enables a user to selectively remove one or more thumbnail images from a photo gallery on a Web page. Preferably, on first use, only Add control 114 will be enabled, and all controls will be disabled. As will be discussed more in detail below, selection of Edit control 116 will result in the display of another Dialog box that contains a larger version of a selected image, as well as user selectable editing options.

A list area 120 enables a user to select one or more images from a currently selected directory. Preferably on first use, the images list will be populated with the images in a user's My Pictures Folder. When this folder is empty, list area 120 will be empty until a user selects a different image source. It should be understood that from a prior menu screen (not separately shown) a user can select an image source other than a user's My Pictures Folder. Preferably, a user will be able to add images from the Web, from a file located in a known directory, and from TWAIN and WIA devices. It is anticipated that enabling a user to import images from a scanner, or in particular from a digital camera (or from memory media that was used to record image data in a digital camera), will be a popular feature. Note that a first item in the list displayed, "HOCKEY.JPG," is shown as being highlighted, indicating that a user has selected that image.

Referring once again to list area 120, images will appear in the image list in the order in which they are added in the selection process. Preferably, the list in list area 120 will be scrollable. A user will be able to select multiple images within the list displayed in list area 120. "Shift-select" selects a range of images, and "Ctrl-select" selects multiple discontinuous images. Images can be removed from list area 120 by selecting one or more images and actuating Remove control 118. Note that if Dialog box 110 is accessed once a photo gallery has already been generated, the image list displayed in list area 120 will be the current contents of the photo gallery. In that case, Remove control 118 can be employed to delete images selected in the images list, from the associated photo gallery. Preferably, a user will also be able to remove images from the image list and a photo gallery by selecting images to remove, and hitting the "Delete" key. While not separately shown, if a user desires to manipulate or edit (adding, removing, cropping, or relocating) thumbnail images in an existing photo gallery, a menu screen is available to enable a user to select the desired photo gallery. In this preferred embodiment, a user is able to select a particular photo gallery by accessing a Web page, and doubling clicking on any thumbnail image. At that point, Dialog box 110 will be displayed to a user.

An Up control 122 and a Down control 124 will move a selected image up or down in the list order. Note that the order of the images in list area 120 determines the relative placement (for example, top to bottom in a vertical array) of thumbnail images in a resulting photo gallery. An image at the top of the list in list area 120 will be the first thumbnail image in a photo gallery, while an image at the bottom of the list in list area 120 will be the last thumbnail image in a photo gallery (assuming that the first and last images in the list have been selected to be included in a photo gallery).

Single or multiple images that appear in sequence can be selected and reorganized. For example, the user may select three adjacent images that currently appear in the middle of the list, which will appear as thumbnail images in a middle section of the resulting photo gallery. After selecting those three images, a user can actuate Down control 124 repeatedly, to move those three images to the end of the list. If no other changes are made, those images will be the last three images in the resulting photo gallery. As noted above, if Dialog box 110 is accessed once a photo gallery has already been generated, the image list displayed in list area 120 will be the contents of the photo gallery. In that case, the up and down controls can be employed to change the order of thumbnail images in the existing photo gallery, by changing the order of the images in the list displayed in list area 120.

A selected image is shown in a Preview Pane 126. As noted above, "HOCKEY.JPG" has been selected from the list in list area 120, and the corresponding thumbnail image of a hockey player is displayed in Preview Pane 126. Preferably, if multiple images have been simultaneously selected, the first image in list area 120 will be displayed in Preview Pane 126. Dialog box 110 includes a text box 128 that will display the total number of images a user has selected to provide thumbnail images for inclusion in a photo gallery to be generated by the present invention.

The size of a thumbnail image preferably defaults to 100 pixels about the primary axis. A parent image that is square will result in a thumbnail image that is 100 pixels in height and 100 pixels in width. A parent original image that is in a portrait format will result in a thumbnail image that is 100 pixels in height, and whose width is proportionate to the original parent image. Similarly, a parent original image that is in a landscape format will result in a thumbnail image that is 100 pixels in width, and whose height is proportionate to the original parent image. A parent original image that is in a panoramic format will result in a thumbnail image that is 200 pixels in width, and whose height is proportionate to the original parent image.

The default size of a thumbnail image described above can be adjusted once the selected thumbnail image is displayed in Preview Pane 126, by using any combination of a Pixel Width control 134 and a Pixel Height control 136.

In this example, the width of the thumbnail image to be displayed in the photo gallery is 75 pixels, as is the height of the thumbnail image. This indicates that a user has affirmatively changed the default pixel size of 100 pixels for the primary axis. Perhaps the parent image was square, and the thumbnail image size was reduced from 100×100 pixels via direct drag manipulation on the thumbnail image displayed in Preview Pane 126, or by using a combination of Pixel Width control 134 and Pixel Height control 136. Alternatively, the original parent image might have been in a portrait, landscape or panoramic format, and a user overrode the function of maintaining the proportion of the original image, by manually selecting the desired thumbnail image size using a combination of Pixel Width control 134 and Pixel Height control 136, and deselecting a Maintain Aspect Ratio checkbox 132 (which is described in more detail below).

Note that the dash line boxes enclosing Pixel Width control 134 and Pixel Height control 136 are preferably not displayed to a user, and have been included in FIG. 3 merely to indicate the relationship between the elements that make up Pixel Width control 134 and Pixel Height control 136. For example, Pixel Width control 134 includes a text portion identifying the control as relating to Pixel Width, a numerical box display indicating a relative number of pixels, and a spinner control that enables a number of pixels to be increased or decreased. Pixel Height control 136 includes similar elements. If a user employs Pixel Width control 134 or Pixel Height control 136 to manipulate the size of a thumbnail image, any such change is dynamically linked to the corresponding thumbnail image displayed in Preview Pane 126.

A Default Size checkbox 130 is actuated when a user desires to employ a default thumbnail size for the photo gallery. Note this default function is different than the thumbnail default sizes discussed above. Note that HOCKEY.JPG is currently selected as the original parent image whose thumbnail image is being previewed in Preview Pane 126. A user has manipulated the size of the preview thumbnail image from a default size of 100 pixels about the primary axis to 75×75 pixels. Now if a user selects Default Size checkbox 130, all other thumbnail images in the current gallery (those thumbnail images corresponding to the original parent images listed in list area 120) will have be displayed as thumbnail images having a size of 75×75 pixels. If Default Size checkbox 130 is not selected, a user can individually alter the size of each thumbnail image corresponding to an original parent image listed in list area 120, by individually selecting the appropriate original parent image from list area 120, and manipulating the preview thumbnail image displayed in Preview Pane 126 as discussed above. Thus a user can adjust the thumbnail size on a per image basis, or on a per gallery basis, using Dialog box 110.

As noted above, Dialog box 110 also includes Maintain aspect ratio checkbox 132, which is preferably selected by default, such that the aspect ratio (ratio of height to width) of the original image is maintained in the thumbnail image. If a user changes a width of the thumbnail image displayed in Preview Pane 126 and Maintain aspect ratio checkbox 132 is selected, the height of the thumbnail image will automatically be adjusted to maintain the aspect ratio of the original image. Thus, if the width of the original image is ½ the height, selecting a width of 100 pixels for the thumbnail image will automatically cause the height of the thumbnail image to be 200 pixels. Maintain aspect ratio checkbox 132 similarly ensures that user selected changes in height result in corresponding changes in width, as required to maintain the desired aspect ratio.

Photo galleries generated by the present invention can include Caption and Descriptive text, but these parameters may not be displayed, depending upon the template selected. As will be described in detail below, some of the photo gallery templates do not provide sufficient space for Caption and Descriptive text to be displayed, and even though such text has been associated with a thumbnail image, it will not be displayed on the Web page. There is no default entry for either Caption text or Descriptive text.

Referring to FIG. 3, a Caption text box 138 includes the text "HOCKEY," which corresponds to the file name of the image highlighted in list area 120 that the user entered, less the ".JPG" file extension. Caption text box 138 will be empty until a user enters some text into the caption text box. It is anticipated that many users will enter the file name, minus the file extension, as caption text. As shown in FIG. 3, a Descriptive text box 140 is empty, indicating that a user has not elected to include any descriptive text to be displayed adjacent to the thumbnail image of a hockey player (see Preview Pane 126) in the photo gallery. Descriptive text box 140 is provided to enable a user to include additional text relating to the thumbnail in question. It is contemplated that the ability to include such descriptive text will be particular useful when a user has elected to use the file name minus the extension for the Caption text. The default text style for both Caption and Descriptive text is preferably based on the styles that already exist on the Web page the photo gallery is to incorporated into.

A Use Font Formatting radio button 141 is selected as a default. When Use Font Formatting radio button 141 is selected, if the Web page the photo gallery is applied to uses Cascading Style Sheets (CSS) or Themes, the Caption and Description text in the photo gallery will match the text formatting specified in the CSS or Theme. If no font formatting exists on the Web page, then Times New Roman, 12 point, black, is selected as the default.

A user can change these default text styles by selecting an Override radio button 143. This activates font style selection controls that enable the user to apply a desired formatting. For example, a user can change text styles by selecting a Font Type drop-down menu 142, a Font Size drop-down window 144, or Bold, Italic, or Underline styles from a style area 146. In a preferred embodiment, a user can also select a different font color, using a font color selection box that has not been separately shown. Note that the dash lines surrounding the Bold, Italic, and Underline styles are not displayed to a user and are included in FIG. 3 for illustrative purposes only.

An OK control 148 is selected by a user to indicate that the selections made in Dialog box 110 are acceptable, and selecting the OK control causes the present invention to generate (or update) a photo gallery in accord with the user's selections. A Cancel control 150 instructs the present invention to discard the selections made in Dialog box 110, and to return to a preceding menu (not separately shown).

Figure 4:
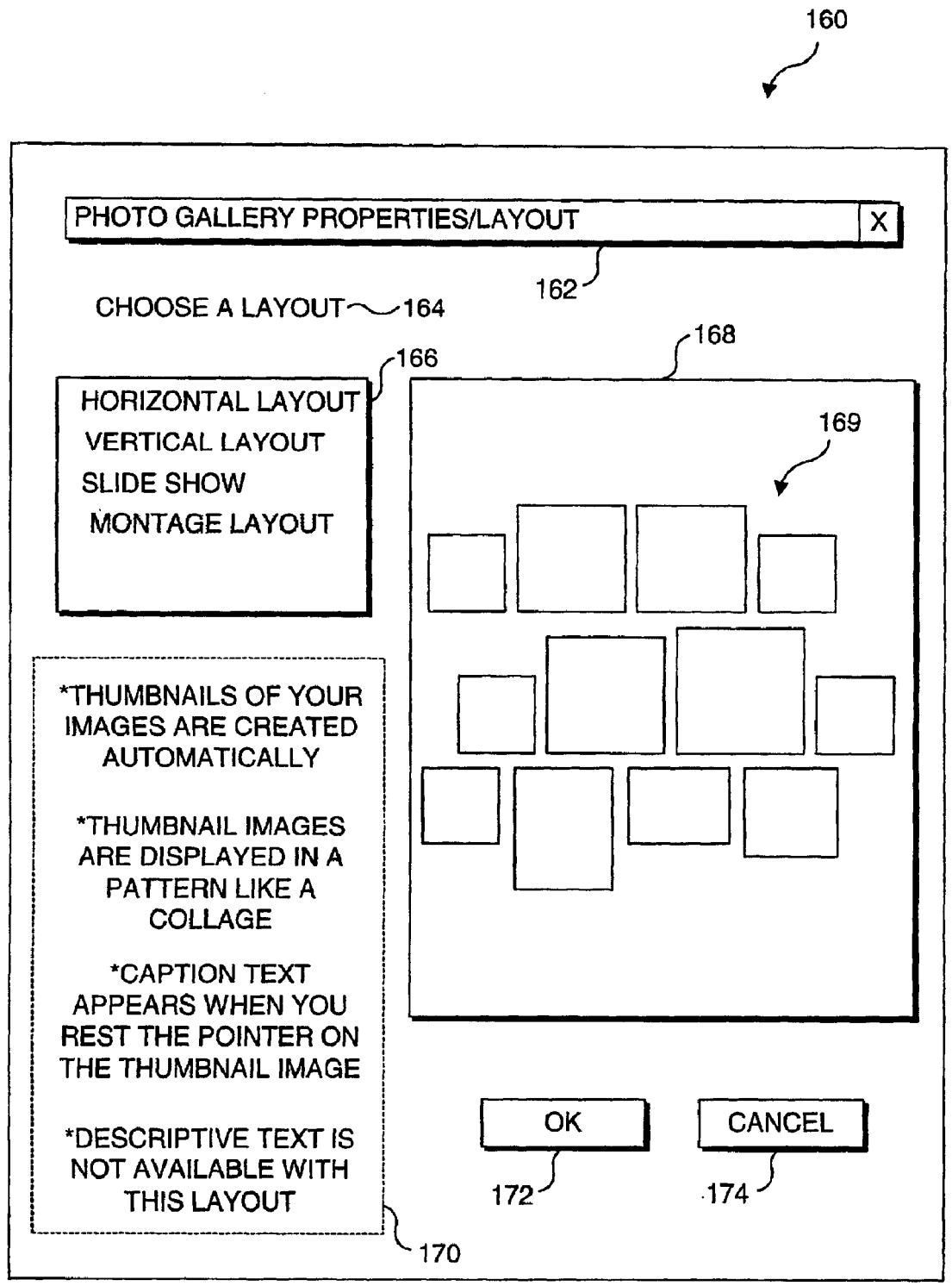
FIG. 4 is an exemplary Dialog box that is provided to enable a user to select a photo gallery template that will control an appearance of a photo gallery of thumbnail images on a Web page, each thumbnail image corresponding to an original image selected in the exemplary Dialog box of FIG. 3.
Figure 5:
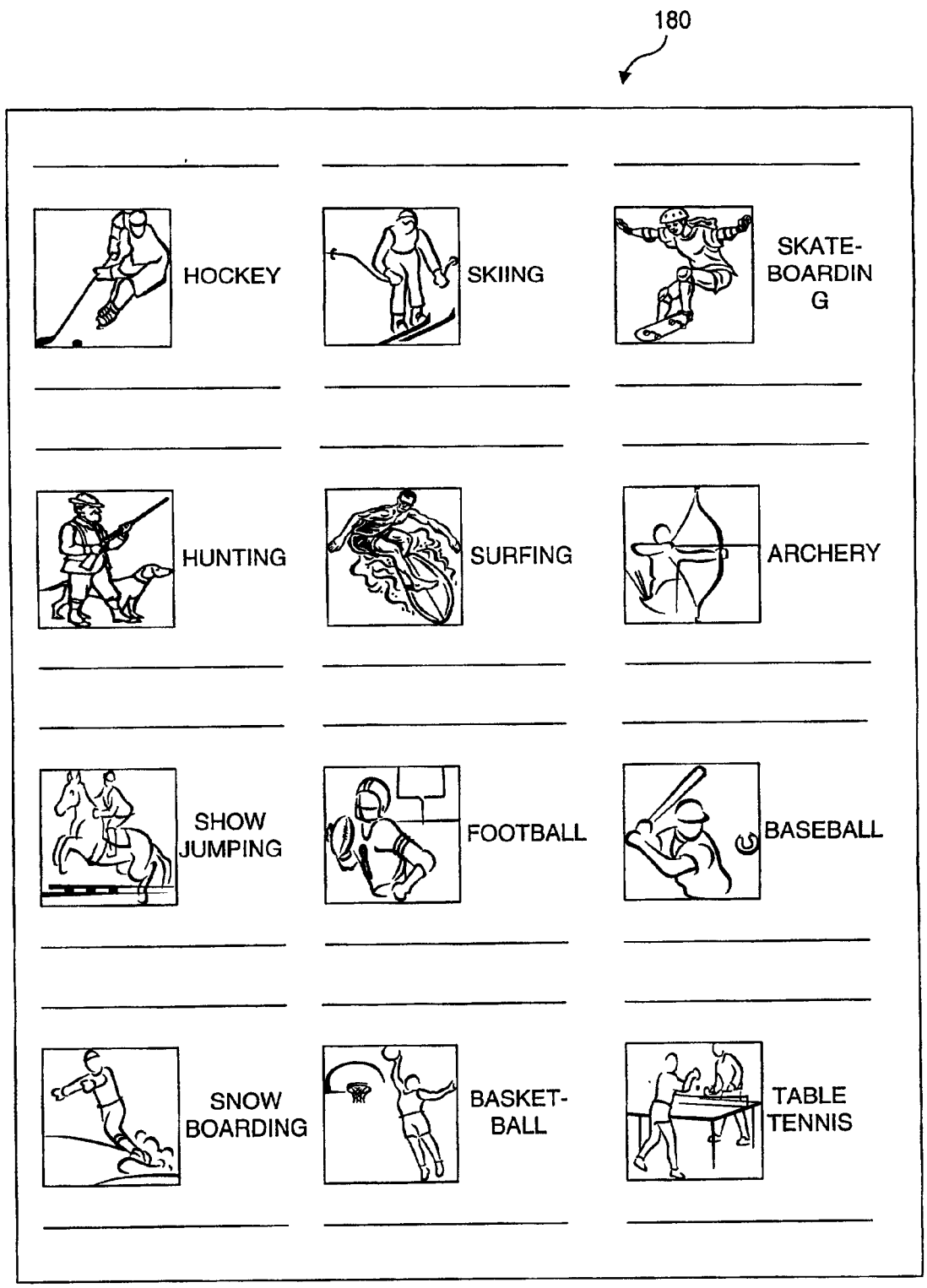
FIG. 5 is a browser program view of an exemplary Web page that includes a photo gallery of thumbnail images corresponding to a plurality of original images selected in the exemplary Dialog box of FIG. 3, and displayed in a horizontal layout selected from the exemplary Dialog box of FIG. 4.
Figure 6:
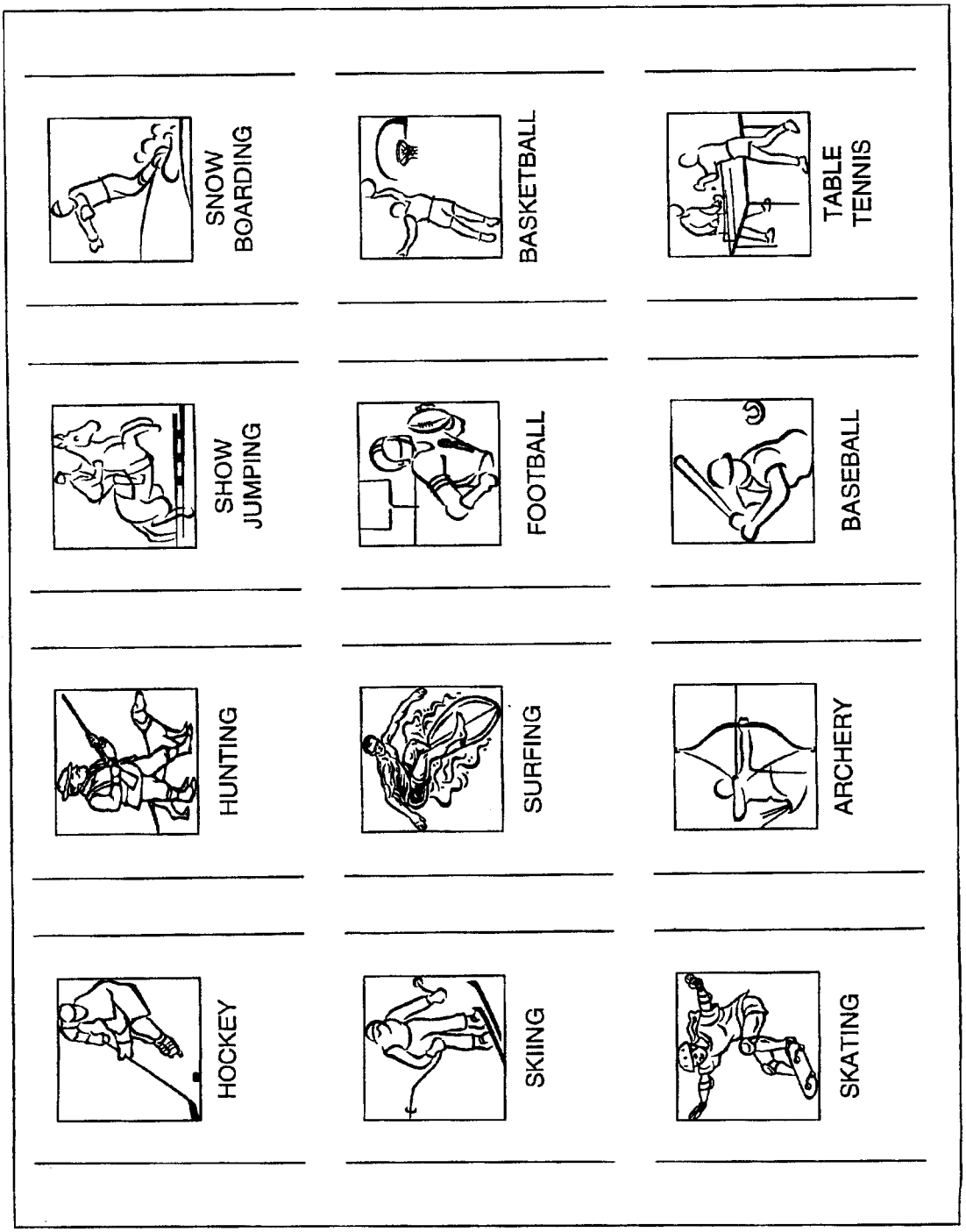
FIG. 6 is a browser view of an exemplary Web page that includes a photo gallery of thumbnail images corresponding to a plurality of original images selected in the exemplary Dialog box of FIG. 3, which are displayed in a vertical layout using the template selected from the exemplary Dialog box of FIG. 4.

As noted above, Dialog box 110 is a Pictures menu, and is preferably reached from a Main Photo Gallery Properties Menu (not shown). The Main Photo Gallery Properties Menu also preferably enables a user to select a Layout menu. This Layout menu enables a user to select a particular photo gallery template from among a plurality of predefined photo gallery templates. Each photo gallery template will result in the generation of a Web page including a different style photo gallery of thumbnail images. A Dialog box 160, shown in FIG. 4, is an exemplary Layout menu that enables a user to select a desired layout for a photo gallery, by selecting one of a plurality of predefined photo gallery templates.

Preferably Dialog box 160 is selectable from the Main Photo Gallery Properties menu (not separately shown) via a tab selection. A text box 162 alerts a user that Dialog box 160 relates to Photo Gallery Properties/Layout. Text 164 prompts a user to select a photo gallery template from a list area 166. While Dialog box 110 shown in FIG. 3 controls the images that will be displayed in a photo gallery produced by the present invention, Dialog box 160 controls the layout or format of the photo gallery in which the thumbnail images are displayed on a Web page.

List area 166 enables a user to select one of the predefined photo gallery templates. In this embodiment, four photo gallery templates are provided. These photo gallery templates include a vertical layout, a horizontal layout, a slide show layout, and a montage layout, as shown in list area 166. Note that MONTAGE LAYOUT is shown as being highlighted, indicating that a user has selected this option to generate a montage style photo gallery on a Web page. If a user does not select a photo gallery template, this embodiment of the present invention will employ the Horizontal layout as a default. If a user has generated a customized photo gallery template, the customized template will also be listed in list area 166. While a user can define a custom photo gallery template, generating such a template requires both XML and XLS programming skills that are generally beyond the capabilities of a casual user, and it is anticipated that few users will actually develop their own templates. Only a single template can be selected at one time. However, if a user has selected the MONTAGE LAYOUT, and later decides that a different photo gallery style is desired, the user can indicate a decision to edit the existing Web page so that Dialog box 160 will be once again displayed, and the user can select a different photo gallery template from among those listed in list area 166. Once a different photo gallery template has been selected by a user, the Web page is automatically updated to use the new template by applying the new formatting information from the new template to the thumbnail photo gallery that is displayed.

A preview of the selected photo gallery template is displayed in a Preview Pane 168. It should be noted that a set of default images 169 are used to provide a preview of each photo gallery template, and that user selected images are not displayed in Preview Pane 168. While default images 169 as shown are blank, in a preferred embodiment a series of landscape images are provided as the default images. As noted above, in this example, the "MONTAGE LAYOUT" has been selected from the list in list area 120, and a montage photo gallery, including thumbnail images of default images 169, is displayed in Preview Pane 168. If a layout template has not been selected, the default preview is of default images 169 formatted according to the Horizontal layout.

Figure 7:
FIG. 7 is a browser view of an exemplary Web page that includes a photo gallery of thumbnail images corresponding to a plurality of original images selected in the exemplary Dialog box of FIG. 3, and displayed in a slide show layout as defined by a corresponding template selected from the exemplary Dialog box of FIG. 4.
Figure 8:
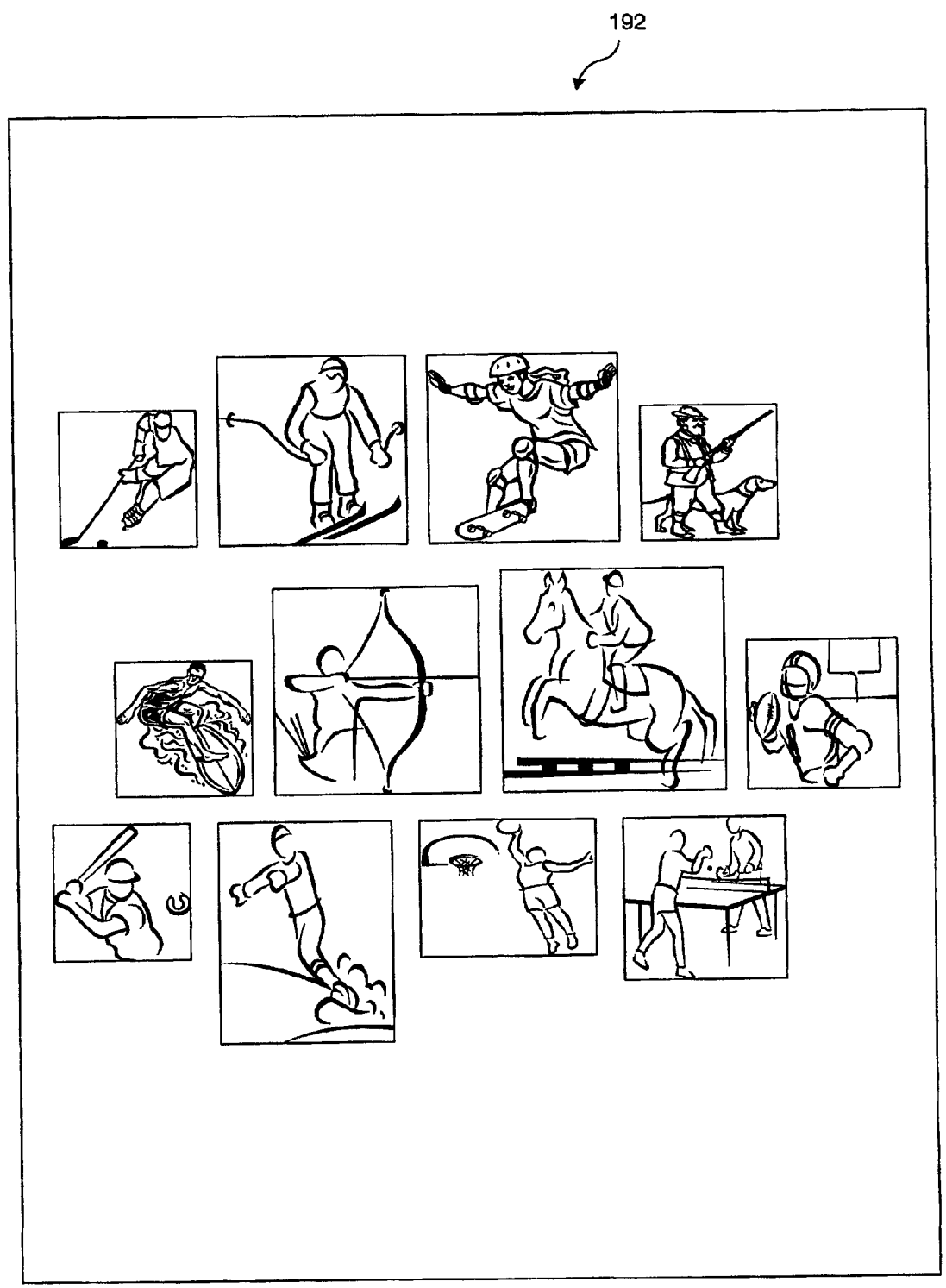
FIG. 8 is a browser view of an exemplary Web page that includes a photo gallery of thumbnail images corresponding to a plurality of original images selected in the exemplary Dialog box of FIG. 3, and displayed in a montage layout as defined by a corresponding template selected from the exemplary Dialog box of FIG. 4.

FIGS. 5–8 show exemplary Web pages developed using each of the four photo gallery templates that will be provided with FRONTPAGE 2002. A photo gallery 180 in FIG. 5 exemplifies a Horizontal Layout; a photo gallery 182 in FIG. 6 exemplifies a Vertical Layout; a photo gallery 184 in FIG. 7 exemplifies a Slide Show Layout; and, a photo gallery 192 in FIG. 8 exemplifies the Montage Layout. Note that the Montage Layout shown in FIG. 8 is identical to the preview shown in Preview Pane 166 of FIG. 4. All photo galleries in FIGS. 5–8 include the same thumbnail images (which conform to the list displayed in list area 120 of FIG. 3, although the names of the last five images cannot be seen in the list without scrolling). Note that in photo galleries 180 and 182, the thumbnail images are all the same size, while in photo gallery 192 (the montage), the thumbnail images are of differing size (as a result of user manipulation). Often thumbnail images in a single gallery will be the same size, such as when a user is importing images from a digital camera, which generally provides images of a consistent size. As previously described, the size of the original parent image, in conjunction with thumbnail default sizes (100 pixels about the primary axis), Default Size checkbox 130, Maintain aspect ratio checkbox 132, Pixel Width control 134 and Pixel Height control 136 determine the size of each thumbnail image.

With respect to photo gallery 192 (the montage), it is anticipated that users will likely desire to individually edit the size of each individual thumbnail image (thus Default Size checkbox 130 will be unselected, so that each thumbnail image size can be individually edited), so that the montage gallery generated has a more aesthetic appearance. In photo gallery 184, a thumbnail image 186a of a surfer has been selected by a user, and a larger size image 186b of the surfer is displayed. Preferably image 186b is the original parent image A user can select any one of the visible thumbnail images to be similarly enlarged. Note that the only Caption text or Description text that will be displayed is that for the thumbnail image relating to the enlarged image. If a user desires to view or select a thumbnail image that is hidden, a back control 190a and a forward control 190b are provided. These controls enable a user to access hidden thumbnail images. If no thumbnail image is yet selected by a user, the first thumbnail image in the photo gallery (which is determined by the order of the list of images displayed in list area 120 of FIG. 3) is shown as both a thumbnail image and an enlarged image. It should be noted that the number of thumbnail images displayed at one time is preferably not fixed, but instead is based on an algorithm for displaying thumbnail images on a 640 pixel width display. If a user has sized thumbnail images to be quite small, there might be eight or ten thumbnail images, while if a user has sized the thumbnail images to be larger, there may be as few as three thumbnail images displayed, in addition to the single original parent image corresponding to one of the three thumbnail images.

Each photo gallery template will include default formatting settings, some of which a user can adjust within minimum and maximum limits, depending upon the specific template. For example, in the Horizontal Layout template, the default number of images per rows is six, the minimum allowable number of images per row is one; and the maximum number of allowable images per rows is ten. For the Montage Layout, the default number of images for the top three rows is four, and the default number of images for the bottom row is three, and the default number of images per row is fixed. The default for the Slide Show Layout template is based on the amount screen space available and the size of the thumbnails, as described above. With respect to the Vertical Layout, the default number of images per rows is two, the minimum allowable number of images per row is one; and the maximum number of allowable images per rows is ten.

As noted above there are defaults for thumbnail sizes. Some photo gallery templates also have additional defaults for the thumbnail size option. For the Horizontal Layout template, the default width is 100 pixels (200 pixels for panoramic images). In the Montage Layout, for the center two rows, the default height is 100 pixels, but there is no default height for the top and bottom rows. For the Slide Show Layout template, default settings for the small thumbnail images are 40×40 pixels (40×100 pixels for panoramic images). In the Vertical Layout template, the default height is 100 pixels. It should be noted that thumbnail images of original panoramic images will fill the space of two standard images.

Referring once again to FIG. 4, a block of text 170 is displayed to a user, describing features of the layout selected in list area 166. As illustrated, text 170 informs about specifics relating to the MONTAGE LAYOUT. Preferred text for each of the layout styles is as follows:

Horizontal Layout

Thumbnail images of your images are created automatically.

Thumbnail images display in multiple rows.

Descriptive text is placed below each image.

Montage Layout

Thumbnail images of your images are created automatically

Thumbnail images are displayed in a pattern like a collage.

Caption text appears when you rest the pointer on the image. Descriptive text is not available with this layout.

Slide Show Layout

Thumbnail images of your images are created automatically.

Thumbnail images are arranged in a row that scrolls across the top.

The selected image is displayed full-size in the center.

Descriptive text is placed below the full-size image.

Vertical Layout

Thumbnail images of your images are created automatically.

Thumbnail images are arranged in columns.

Descriptive text is placed to the right of the images.

An OK control 172 is selected by a user to indicate that the selections made in Dialog box 160 are acceptable, and that the present invention is instructed to generate (or update) a photo gallery in accord with the user's selections. A Cancel control 174 is selected to discard the selections made in Dialog box 160, and to return to a preceding menu or state.

Referring once again to Edit control 116 of FIG. 3, a user will select the Edit function to edit the original images that were used to generate thumbnail images for inclusion in a photo gallery. Changes to the original images automatically result in changes in the corresponding thumbnail, with the exception that default thumbnail sizes will not be over ridden if the size of the original image is changed. Note that if a user accesses the original image from dialog box other than Dialog box 194 (of FIG. 9), and edits the original image, those edits will not be linked to the corresponding thumbnail image. Upon selecting Edit control 116, a Dialog box 194 shown in FIG. 9 will be displayed to a user. A Text box 196 alerts a user that Dialog box 194 relates to Photo Gallery Properties/Pictures/Edit. Dialog box 194 displays a plurality of options that may be selected by a user for controlling various parameters of the original images used to generate the thumbnail images that make up a photo gallery on a Web page. The picture edit function can be used in conjunction with generating a new photo gallery, or editing original images and their corresponding thumbnail images in an existing photo gallery.

A Preview Pane 198 includes an original image ready for editing. The particular original image displayed in Preview Pane 198 correspond to the thumbnail image selected in list area 120 of FIG. 3, which is also displayed in thumbnail form in Preview Pane 126 of FIG. 3. Thus, the first image available for editing in Dialog box 194 is that corresponding to the thumbnail image most recently selected in Dialog box 110 of FIG. 3. Preview Pane 198 displays the original hockey image ("HOCKEY.JPG") corresponding to the thumbnail image previously selected. Note that Preview Pane 198 includes scale bars 200 to enable a user to more accurately adjust both a height and width of the image being displayed in Preview Pane 198.

A Previous control 202 and a Next control 204 enable a user to replace the original image currently being displayed in Preview Pane 198 with another original image from the list used to generate the thumbnail images in a photo gallery whose images are being edited. Note that the order of the images is determined by the list displayed in list area 120 of FIG. 3. The Next and Previous controls "wrap around", such that selecting Previous control 202 on the first image will result in the display of the last image in list area 120. Similarly, selecting Next control 204 when on the last image will result in the display of the first imaged listed in list area 120. Since "HOCKEY.JPG" is at the top of the list, selecting Previous control 202 will result in the display of the original image of "TABLETENNIS.JPG," which is the last image in the list displayed in list area 120. Note that "TABLETENNIS.JPG" is not visible in list area 120, as the list exceeds the size of the list box. However, note that in the examples of the different photo gallery layouts (FIGS. 5, 6 and 8; noting that FIG. 7 illustrates the slide show format, and not all thumbnail images are visible at once), a thumbnail image corresponding to "TABLETENNIS.JPG" is always the last thumbnail image displayed, indicating that "TABLETENNIS.JPG" is the last image listed in list area 120. Referring once again to "HOCKEY.JPG", selecting Next control 204 when "HOCKEY.JPG" is the selected image will result in the display of the original image of "SKIING.JPG," which is the next image in the list displayed in list area 120.

While not currently implemented in a preferred embodiment, it is comtemplated that the size of the original image displayed in Preview Pane 198 might be adjusted by a direct drag manipulation of the borders or corners of the image, as an alternative to using a Pixel Width control 206 and a Pixel Height control 208. Note that the dash-line boxes enclosing Pixel Width control 206 and Pixel Height control 208 are not displayed to a user in this exemplary embodiment, and have been included in FIG. 9 merely to indicate the elements included in Pixel Width control 206 and Pixel Height control 208, respectively. As with the controls described in conjunction with FIG. 3, Pixel Width control 206 includes a text portion identifying the control as relating to Pixel Width, a numerical entry box display for entry of a desired number of pixels, and a spinner control that enables a number of pixels to be increased or decreased. Pixel Height control 208 includes similar elements relating to image height. The difference between the Pixel Width and Pixel Height controls of Dialog box 110 in FIG. 3 and the corresponding controls of Dialog box 194 in FIG. 9 is that is that the Pixel Width and Pixel Height control settings of Dialog box 110 are applied to a selected thumbnail image, while in Dialog box 194, the Pixel Width and Pixel Height control settings are applied to a selected original image.

As noted above, if a user employs a direct drag manipulation of the image displayed in Preview Pane 198, rather than utilizing Pixel Width control 206 and Pixel Height control 208, the numerical displays of Pixel Width control 206 and Pixel Height control 208 will be dynamically updated to reflect the adjusted size of the original image displayed in Preview Pane 198. In this example, the width and height of the original image is 640 pixels.

Preferably, a Maintain aspect ratio checkbox 211 is selected by default, such that the aspect ratio (ratio of height to width) of the original image is maintained. If a user changes a width of an original image and Maintain aspect ratio checkbox 211 is selected, the height of the edited original image will automatically be adjusted to maintain the aspect ratio of the original image. Thus, if the width of the original image is one-half the height and the Maintain aspect ratio option is active, selecting a width of 100 pixels for the edited original image will automatically cause the height of the edited original image to be 200 pixels. The same control of aspect ratio applies to changes made by direct drag manipulation of the image.

Also, a Set as Default Size check box 210 is preferably selected by default, such that the selected size becomes a new default for the original images.

Dialog box 194 also includes a plurality of Rotate Picture controls 212–218. A Rotate Picture control 212 rotates the original image 90 degrees to the left, while a Rotate Picture control 214 rotates the original image by 90 degrees to the right. A Flip Vertical Picture control 216 flips the original image about a horizontal axis, while a Flip Horizontal Picture control 218 flips the original image about a vertical axis. Note that these edit functions not only affect the original image, but also automatically update the thumbnail image generated from the original image as well. However, the editing the size of the original image does not similarly affect the thumbnail images, because of size settings (or default values) controlling the size of the thumbnail images.

A Crop control 220 enables a user to crop the original image and includes a text label describing the dimensions of the area within the crop frame, once the Crop function has been activated. Crop functions are well known in the art. If the content of the original image is changed by cropping, the corresponding thumbnail image will reflect the change in its original image.

A Reset control 222 discards any cropping, rotating, or resizing functions performed on the currently selected original image. An OK control 224 is selected by a user to indicate that the selections made in Dialog box 198 are acceptable, causing the software to generate (or update) a photo gallery in accord with the user's selections. A Cancel control 226 is selected to indicate a decision to discard any selections just made in Dialog box 194, and to return to the preceding menu. If, after opening Dialog box 194, ten different images have been edited and an eleventh image is currently being displayed in Preview Pane 198, and if a user actuates Cancel control 226, all changes to all ten images will be lost. The only way to ensure that edits are accepted and stored is to actuate OK control 224. Referring now to FIG. 10, a flow chart 230 is shown that illustrates the logical steps implemented by this embodiment of the present invention to generate a photo gallery of thumbnail images on a Web page after a user selects a group of original images. Moving from a start block 232 in which the application employing the present invention is activated, the logic enumerates the predefined photo gallery templates in a block 234. Then, in a decision block 236, the logic determines if a user has selected a specific photo gallery template. If so, in a block 238, the logic retrieves the selected photo gallery template. If a user has not selected a specific photo gallery template in decision block 236, the logic advances to a block 240, and a default template is retrieved. As discussed above, the horizontal photo gallery template is preferably employed as the default template if the user does not choose a template. Regardless of whether a default template or a user selected template is retrieved, the next step in the logical sequence is to display picture gallery Dialog box 110 of FIG. 3 to a user in a block 242.

Dialog box 110 enables a user to either select a plurality of images to add to an existing photo gallery or for use in generating a new photo gallery, or to selectively to edit images, as described in detail above with respect to FIGS. 3 and 9. The logic then advances to a block 246, indicating that user input has been completed (as described above, this condition is indicated when a user selects the OK control from Dialog box 110). The OK control from Dialog box 194 returns a user to Dialog box 110.

A user selects images to be used to generate a photo gallery (or edits an existing photo gallery) in a block 244. Once user input is complete, in a block 246, thumbnail images are produced in a block 248 for all the original images selected or edited. Note that in the prior art, a user has generally been required to manually initiate the generation of thumbnail images from original images by individually selecting each original image, whereas in block 248 thumbnail images are automatically generated from a plurality of original images, without requiring multiple instructions or acts from a user. Note that in block 248, not only are thumbnail images produced for each original image selected (or edited), but hyperlinks connecting each thumbnail to the corresponding original image are also generated. In block 248, a link attribute is automatically added to (associated with) each of the thumbnail images. Whenever a recipient user selects the thumbnail image in the Web page that is being created, the selection will cause the web browser to activate the link attribute and display the original image corresponding to the selected thumbnail image.

The logic next proceeds to a block 250, in which an XML data manifest is generated, which contains the thumbnail and hyperlink data generated in block 248. A preferable format for the XML data manifest used with the XLS Layout Template corresponds to the Schema provided below (see Sample #1). Some specific points relevant to the preferred XML manifest are that the XML provided must be either UTF8 encoded or the "encoding" attribute must be set to the code page of the text in the captions Based on a particular photo gallery template selected, this embodiment of the present invention provides an <options> block included in the XML manifest that contains:

An "imgPerRow" attribute specifying the number of images per Row;

A "pageName" attribute specifying the filename of the page on which the layout is being inserted. This attribute will be used to set the title attribute on the generated HTML page to "photo gallery for [page name];"

A <dependent-files> block containing the original <dependent-files> list specified in the template but with the 'path' attribute updated to point to the files in their actual location in the web;

The XML manifest will also include a <pictures> block containing zero to many <picture> elements and each <picture> element has the following attributes and elements:

A "file"—attribute—which is the URL to the main image file;

A "filewidth"—attribute—which is the width of the main image;

A "fileheight"—attribute—which is the height of the main image;

A "thumb"—attribute—which is the URL to the thumbnail image;

A "thumbheight"—attribute—which is the height of the thumbnail image;

A "thumbwidth"—attribute—which is the width of the thumbnail image;

A "caption"—element—which is a short block of HTML about the picture; any HTML can be specified, as long as it is well-formed;

A "description"—element—which is a longer description of the image; any HTML can be specified, as long as it is well-formed.

Once the XML data manifest is generated, the logic advances to a block 252 and the XML data manifest is stored. In a block 254, the logic loads the XLS template file relating to the selected photo gallery template, and then in a block 256, the logic generates an HTML file using the XLS file for the selected photo gallery template and the XML data manifest, including the thumbnail image data and hyperlink data. The HTML file thus generated defines a Web page that includes a thumbnail image gallery of all the selected or edited images, arranged in the format dictated by the selected (or default) photo gallery template.

Once the HTML file has been generated, a preview of the Web page is displayed to a user in a block 258. The logic then advances to a decision block 260, in which the logic determines if a user desires to edit the current photo gallery. If so, the logic returns to block 242, and picture gallery Dialog box 110 of FIG. 3 is once again displayed to a user. If, in decision block 260, a user elects not to edit the current photo gallery, the logic advances to a block 262, and the HTML file is saved. In a next block 264, the thumbnail images and original images are stored, and in a block 268, the final HTML file is rendered and saved.

In a decision block 270, the logic determines if a user is finished generating or editing photo galleries. If not, a user is once again returned to block 242, and the picture gallery Dialog box 110 of FIG. 3 is once again displayed to a user. Once a user has indicated that no further editing is to be done, then the logic flow terminates at an end block 272.

It should be noted that a user can indicate a desire to edit in several fashions. If Dialog box 110 (FIG. 3) is displayed to a user (and the display is not a first use (in which Edit control 116 is disabled)), a user can actuate Edit control 116, and Dialog box 194 will be displayed to a user so that the user can select an original image to edit as described above in conjunction with FIG. 9. Note that once a user selects OK control 224 in Dialog box 194 of FIG. 9, a user is returned to Dialog box 110 of FIG. 3. If Dialog box 110 is displayed to a user, the user can select an image from the list in list area 120 and either perform a drag manipulation on the thumbnail image displayed in Preview Pane 126, or employ Pixel Width control 134 and/or Pixel Height control 136 to edit the thumbnail image displayed in Preview Pane 126. The present invention also enables a user to initiate editing by double clicking on a specific thumbnail image displayed in a photo gallery on a Web page generated by the present invention. Double clicking a thumbnail image will cause the display of Dialog box 110, and the thumbnail image that was thus selected will be automatically highlighted in list area 120 and automatically displayed in Preview Pane 126.

A user can add thumbnail images of additional original images to an existing photo gallery on a Web page by accessing the Web page and using a drag and drop function while the application that includes the present invention is active. In addition, a user can select a plurality of images, and then drag the images over the photo gallery, causing the images to be added and automatically "thumb nailed," for use in the photo gallery. The images thus selected will be added to the end of list of images already included in the photo gallery. Should a user desire to add or edit Caption or Description text, or edit an image, it will be necessary for the user to again open Dialog box 110.

Preferably the present invention includes an automatic file clean up utility. When the invention generates a set of thumbnails images as described above, those thumbnail images are stored in a Photo Gallery file. When a user decides to delete a particular Photo Gallery, rather than leaving the previously stored thumbnail images used in the Photo Gallery that has been deleted in the Photo Gallery file, those thumbnail images are automatically deleted. This type of clean up is something users would normally have to do affirmatively do (and generally don't end up doing).

Exemplary Coding

The following samples of program code are provided: (1) a preferred Schema for the XML manifest, showing the elements that are required to generate an XML manifest in accord with the present invention; (2) an exemplary XML data manifest that follows the XML Schema of the Sample; (3) a sample of a preferred format for XLS Template data; (4) an exemplary XSL Horizontal Photo Gallery template; (5) an exemplary XSL Montage Photo Gallery template; (6) an exemplary XSL Slide Show Photo Gallery template; and (7) an exemplary XSL Vertical Photo Gallery template.

Sample Schema for XML Data Manifest

```
<?xml version="1.0"?>
<Schema xmlns="urn:schemas-microsoft-com:xml-data">
    <ElementType name="caption" content="mixed" model="open">
        <description>
            This entry is a short caption for the image. This node will contain arbitrary HTML
        </description>
    </ElementType>
    <ElementType name="desc" content="mixed" model="open">
        <description>
            This is a longer description for the image. This node will contain arbitrary HTML
        </description>
    </ElementType>
    <ElementType name="picture" content="eltOnly" model="closed">
        <description>
            All the info about a given image is stored here.
        </description>
        <AttributeType name="file"/>
        <AttributeType name="filewidth"/>
        <AttributeType name="fileheight"/>
        <AttributeType name="thumb"/>
        <AttributeType name="thumbwidth"/>
        <AttributeType name="thumbheight"/>
        <attribute type="file" required="yes"/>
        <attribute type="filewidth" required="yes"/>
        <attribute type="fileheight" required="yes"/>
        <attribute type="thumb" required="yes"/>
        <attribute type="thumbwidth" required="yes"/>
        <attribute type="thumbheight" required="yes"/>
        <element type="caption" minOccurs="1" maxOccurs="1"/>
        <element type="desc" minOccurs="1" maxOccurs="1"/>
    </ElementType>
    <ElementType name="pictures" content="eltOnly" model="closed">
        <element type="picture" minOccurs="0" maxOccurs="*"/>
    </ElementType>
```

```
          <ElementType name="file" content="empty" model="closed">
          <description>
          The options node may contain a list of dependent files. This list is based on the
   list
5         of files stored in the dependent-files node of the template node in the layout
   template
          </description>
          <AttributeType name="id"/>
          <AttributeType name="path"/>
10        <attribute type="id" required="yes"/>
          <attribute type="path" required="yes"/>
          </ElementType>
          <ElementType name="dependent-files" content="eltOnly" model="closed">
          <element type="file" minOccurs="0" maxOccurs="*"/>
15        </ElementType>
          <ElementType name="options" content="eltOnly" model="closed">
          <description>
          This node contains global options for the layout template, such as the number
          of images to put on each row, and the title of the page it generates.
20        </description>
          <AttributeType name="imgPerRow"/>
          <AttributeType name="pageName"/>
          <attribute type="imgPerRow" required="yes"/>
          <attribute type="pageName" required="yes"/>
25        <element type="dependent-files" minOccurs="0" maxOccurs="1"/>
          </ElementType>
          <ElementType name="gallery" model="open">
            <element type="options" minOccurs="1" maxOccurs="1"/>
            <element type="pictures" minOccurs="1" maxOccurs="1"/>
30        </ElementType>
          </Schema>
```

Sample 2: Exemplary XML Manifest
```
          <?xml version="1.0" encoding="utf-8" ?>
          <gallery output="real">
35        <options numperrow="4" pageName="This is the page">
          <dependent-files>
          <file name="scripts" path="../fpslideshow.js" />
          </dependent-files>
          </options>
40        <pictures>
```

```
<picture file="images/sqj0202082.jpg" fileheight="400" filewidth="400"
thumb="images/sqj0202082.jpg" thumbheight="80" thumbwidth="80">
  <caption>
  <b>this is</b>
  my caption1
  </caption>
  <desc>
  <font color="red">this is</font>
  <a href="foo.htm">the description</a>
  </desc>
</picture>
<picture file="images/sqj0227559.jpg" fileheight="400" filewidth="400"
thumb="images/sqj0227559.jpg" thumbheight="120" thumbwidth="80">
  <caption>
  <b>this is</b>
  my caption2
  </caption>
  <desc>
  <font color="red">this is</font>
  <a href="foo.htm">the description</a>
  </desc>
</picture>
<picture file="images/sqj0227665.jpg" fileheight="400" filewidth="400"
thumb="images/sqj0227665.jpg" thumbheight="80" thumbwidth="80">
  <caption>
  <b>this is</b>
  my caption3
  </caption>
  <desc>
  <font color="red">this is</font>
  <a href="foo.htm">the description</a>
  </desc>
</picture>
<picture file="images/sqj0227726.jpg" fileheight="400" filewidth="400"
thumb="images/sqj0227726.jpg" thumbheight="80" thumbwidth="80">
  <caption>
  <b>this is</b>
  my caption4
  </caption>
  <desc>
  <font color="red">this is</font>
  <a href="foo.htm">the description</a>
```

```
        </desc>
        </picture>
        <picture file="images/sqTMP4_small[1].jpg" fileheight="143"
    filewidth="300" thumb="images/sqTMP4_small[1].jpg" thumbheight="80"
5   thumbwidth="200">
        <caption>
        <b>this is</b>
        my caption5
        </caption>
10      <desc>
        <font color="red">this is</font>
        <a href="foo.htm">the description</a>
        </desc>
        </picture>
15      <picture file="images/sqj0262720.jpg" fileheight="400" filewidth="400"
    thumb="images/sqj0262720.jpg" thumbheight="80" thumbwidth="80">
        <caption>
        <b>this is</b>
        my caption6
20      </caption>
        <desc>
        <font color="red">this is</font>
        <a href="foo.htm">the description</a>
        </desc>
25      </picture>
        <picture file="images/sqj0262723.jpg" fileheight="400" filewidth="400"
    thumb="images/sqj0262723.jpg" thumbheight="80" thumbwidth="80">
        <caption>
        <b>this is</b>
30      my caption7
        </caption>
        <desc>
        <font color="red">this is</font>
        <a href="foo.htm">the description</a>
35      </desc>
        </picture>
        <picture file="images/sqj0262797.jpg" fileheight="400" filewidth="400"
    thumb="images/sqj0262797.jpg" thumbheight="80" thumbwidth="80">
        <caption>
40      <b>this is</b>
        my caption8
        </caption>
```

```
     <desc>
     <font color="red">this is</font>
     <a href="foo.htm">the description</a>
     </desc>
 5   </picture>
     <picture file="images/sqj0227665.jpg" fileheight="400" filewidth="400"
     thumb="images/sqj0227665.jpg" thumbheight="80" thumbwidth="80">
     <caption>
     <b>this is</b>
10   my caption9
     </caption>
     <desc>
     <font color="red">this is</font>
     <a href="foo.htm">the description</a>
15   </desc>
     </picture>
     <picture file="images/sqj0202082.jpg" fileheight="400" filewidth="400"
     thumb="images/sqj0202082.jpg" thumbheight="80" thumbwidth="80">
     <caption>
20   <b>this is</b>
     my caption1
     </caption>
     <desc>
     <font color="red">this is</font>
25   <a href="foo.htm">the description</a>
     </desc>
     </picture>
     <picture file="images/sqj0227559.jpg" fileheight="400" filewidth="400"
     thumb="images/sqj0227559.jpg" thumbheight="120" thumbwidth="80">
30   <caption>
     <b>this is</b>
     my caption2
     </caption>
     <desc>
35   <font color="red">this is</font>
     <a href="foo.htm">the description</a>
     </desc>
     </picture>
     <picture file="images/sqj0227665.jpg" fileheight="400" filewidth="400"
40   thumb="images/sqj0227665.jpg" thumbheight="80" thumbwidth="80">
     <caption>
     <b>this is</b>
```

```
                my caption3
            </caption>
            <desc>
            <font color="red">this is</font>
            <a href="foo.htm">the description</a>
            </desc>
            </picture>
            <picture file="images/sqj0227726.jpg" fileheight="400" filewidth="400"
        thumb="images/sqj0227726.jpg" thumbheight="80" thumbwidth="80">
            <caption>
            <b>this is</b>
            my caption4
            </caption>
            <desc>
            <font color="red">this is</font>
            <a href="foo.htm">the description</a>
            </desc>
            </picture>
            <picture file="images/sqTMP4_small[1].jpg" fileheight="143"
        filewidth="300" thumb="images/sqTMP4_small[1].jpg" thumbheight="80"
        thumbwidth="200">
            <caption>
            <b>this is</b>
            my caption5
            </caption>
            <desc>
            <font color="red">this is</font>
            <a href="foo.htm">the description</a>
            </desc>
            </picture>
            <picture file="images/sqj0262720.jpg" fileheight="400" filewidth="400"
        thumb="images/sqj0262720.jpg" thumbheight="80" thumbwidth="80">
            <caption>
            <b>this is</b>
            my caption6
            </caption>
            <desc>
            <font color="red">this is</font>
            <a href="foo.htm">the description</a>
            </desc>
            </picture>
```

```
        <picture file="images/sqj0262723.jpg" fileheight="400" filewidth="400"
    thumb="images/sqj0262723.jpg" thumbheight="80" thumbwidth="80">
        <caption>
        <b>this is</b>
        my caption7
        </caption>
        <desc>
        <font color="red">this is</font>
        <a href="foo.htm">the description</a>
        </desc>
        </picture>
        <picture file="images/sqj0262797.jpg" fileheight="400" filewidth="400"
    thumb="images/sqj0262797.jpg" thumbheight="80" thumbwidth="80">
        <caption>
        <b>this is</b>
        my caption8
        </caption>
        <desc>
        <font color="red">this is</font>
        <a href="foo.htm">the description</a>
        </desc>
        </picture>
        <picture file="images/sqj0227665.jpg" fileheight="400" filewidth="400"
    thumb="images/sqj0227665.jpg" thumbheight="80" thumbwidth="80">
        <caption>
        <b>this is</b>
        my caption9
        </caption>
        <desc>
        <font color="red">this is</font>
        <a href="foo.htm">the description</a>
        </desc>
        </picture>
        </pictures>
        </gallery>
```

Sample 3: XLS Template Format
```
<template>
        <title>Vertical Layout</title>
        <description>A Simple Vertical Layout</description>
        <previewImg>LayoutVert3.gif</previewImg>
        <defaults imgPerRow="2" thumbWidth="100" />
```

```
            <dependent-files>
                    <file id="leftImg" path="left.gif"/>
            </dependent-files>
    </template>
```

5      Sample 4: Horizontal XLS Template
```
        < <?xml version="1.0" ?>
        <xsl:stylesheet xmlns:xsl="http://www.w3.org/TR/WD-xsl">
        <xsl:script>
        <![CDATA[
10      var gMaxHeight = 0;
                var gnumPerRow = "";
        function breakRow(e) {
                    if (gnumPerRow == "") {
                            gnumPerRow =
15      e.selectSingleNode("//options").getAttribute("numperrow");
                    }
                    return ((absoluteChildNumber(e) - 1)%gnumPerRow) == 0;
        }
        function notPreviewOutput(e) {
20                  if (e.selectSingleNode("/xml[@output='preview']")) {
                            return false;
                    } else {
                            return true;
                    }
25      }
        function NBSP()
        {
                    return "document.write(\"<td bgcolor='#AAAAAA'
        width='1'> </td>\");";
30      }
        function rowEnd(e) {
                    if (gnumPerRow == "") {
                            gnumPerRow =
        e.selectSingleNode("//options").getAttribute("numperrow");
35                  }
                    var childList = e.selectSingleNode("//pictures").childNodes;
                    return ((absoluteChildNumber(e))%gnumPerRow) == 0 ||
        childList.length == absoluteChildNumber(e);
        }
40              //generate a random int to identify the functions and objects in this gallery
                var rnd = Math.round(Math.random() * 10000);
```

```
function setMaxHeight(e) {
    var childList = e.selectSingleNode("//pictures").childNodes;
    var maxHeight = 0;
    for (i=0;i<childList.length;i++) {
        if (parseInt(childList[i].getAttribute("thumbheight")) > maxHeight) {
            maxHeight = parseInt(childList[i].getAttribute("thumbheight"));
        }
    }
    gMaxHeight = maxHeight;
}
]]>
</xsl:script>
<!--
        the template block describes this template.
        this info is used by FP when building the photo gallery dialog
-->
<template>
<title>
<!--
                    _locID_text="Title"
-->
Horizontal Layout
</title>
<description>
- <!--
_locID_text="Description"
-->
- Thumbnail images of your images are created automatically. - Thumbnail images display in multiple rows. - Descriptive text is placed below each image.
</description>
<defaults imgPerRow="7" thumbWidth="100" />
<dependent-files />
</template>
<xsl:template>
<xsl:copy>
<xsl:apply-templates select="@* | * | comment() | pi() | text()" />
</xsl:copy>
</xsl:template>
<xsl:template match="/">
<xsl:eval>setMaxHeight(this)</xsl:eval>
<xsl:apply-templates select="xml" />
</xsl:template>
```

```xml
<!--
this template has identical Preview and Real output
-->
<xsl:template match="xml[@output != 'subpage']">
  <html>
  <head>
  <meta http-equiv="Content-Type" content="text/html; charset=utf-8" />
  <title>
  <xsl:value-of select="//options/@pageName" />
  </title>
  </head>
  <body>
  <xsl:if expr="notPreviewOutput(this)">
  <picture file-href="real_p.htm" />
  <picture file-href="real_x.htm" />
  </xsl:if>
  <table border="0" cellspacing="0" cellpadding="0">
  <xsl:attribute name="id">
  fpGalleryTable_
  <xsl:eval>rnd</xsl:eval>
  </xsl:attribute>
  <tr>
  <xsl:for-each select="//pictures">
  <xsl:apply-templates />
  </xsl:for-each>
  </tr>
  <tr>
  <td>
  <xsl:attribute name="colspan">
  <xsl:eval>gnumPerRow</xsl:eval>
  </xsl:attribute>
  </td>
  </tr>
  </table>
  </body>
  </html>
</xsl:template>
<!--
this is the output we generate for each sub page of the gallery
-->
<xsl:template match="xml[@output='subpage']">
  <html>
```

```
    <head>
    <meta http-equiv="Content-Type" content="text/html; charset=utf-8" />
    <title>
    <xsl:value-of select="//picture/caption" />
5   </title>
    </head>
    <body>
    <div align="center">
    <table width="100%" align="center">
10  <tr>
    <td width="100%" align="center" colspan="3">
    <img hspace="10" border="0">
    <xsl:attribute name="width">
    <xsl:value-of select="//picture/@filewidth" />
15  </xsl:attribute>
    <xsl:attribute name="height">
    <xsl:value-of select="//picture/@fileheight" />
    </xsl:attribute>
    <xsl:attribute name="src">
20  <xsl:value-of select="//picture/@file-href" />
    </xsl:attribute>
    <xsl:attribute name="title">
    <xsl:value-of select="//picture/caption" />
    </xsl:attribute>
25  </img>
    </td>
    </tr>
    <tr>
    <td colspan="3">
30  <xsl:apply-templates select="//picture/caption" />
    </td>
    </tr>
    <tr>
    <td colspan="3">
35  <xsl:apply-templates select="//picture/desc" />
    </td>
    </tr>
    <tr>
    <td>
40  <a>
    <xsl:attribute name="href">
    <xsl:value-of select="//picture/@prevImgPath" />
```

```
            </xsl:attribute>
            -<!--
            _locID_text="PrevImg"
            -->
 5          Previous Image
            </a>
            </td>
            <td>
            <a>
10          <xsl:attribute name="href">
            <xsl:value-of select="//picture/@galleryPath" />
            </xsl:attribute>
            -<!--
            _locID_text="BackGal"
15          -->
            Back To Gallery
            </a>
            </td>
            <td>
20          <a>
            <xsl:attribute name="href">
            <xsl:value-of select="//picture/@nextImgPath" />
            </xsl:attribute>
            -<!--
25          _locID_text="NextImg"
            -->
            Next Image
            </a>
            </td>
30          </tr>
            </table>
            </div>
            </body>
            </html>
35          </xsl:template>
            <xsl:template match="picture">
            <xsl:if expr="breakRow(this)">
            <tr>
            <td height="10" />
40          </tr>
            <tr />
            </xsl:if>
```

```
        <xsl:choose>
        <xsl:when expr="rowEnd(this)">
        <xsl:if expr="notPreviewOutput(this)">
        <script language="JavaScript1.1">
  5     if (navigator.appName == "Netscape")
        <xsl:eval no-entities="t">NBSP()</xsl:eval>
        </script>
        </xsl:if>
        <td valign="top">
 10     <xsl:attribute name="style">border-left-style: solid; border-left-width: 1; border-
        left-color:black; border-right-style: solid; border-right-width: 1; border-right-
        color:black</xsl:attribute>
        <table border="0" cellpadding="2" cellspacing="0" align="center"
        width="120">
 15     <tr>
        <td valign="top" align="center">
        <xsl:attribute name="height">
        <xsl:eval>gMaxHeight + 20</xsl:eval>
        </xsl:attribute>
 20     <a>
        <xsl:attribute name="href">
        <xsl:value-of select="@file-href" />
        </xsl:attribute>
        <img border="0" vspace="5" hspace="12">
 25     <xsl:attribute name="src">
        <xsl:value-of select="@thumb-href" />
        </xsl:attribute>
        <xsl:attribute name="width">
        <xsl:value-of select="@thumbwidth" />
 30     </xsl:attribute>
        <xsl:attribute name="height">
        <xsl:value-of select="@thumbheight" />
        </xsl:attribute>
        <xsl:attribute name="title">
 35     <xsl:value-of select="@caption" />
        </xsl:attribute>
        </img>
        </a>
        </td>
 40     </tr>
        <tr>
        <td valign="top">
```

```
                <xsl:apply-templates select="caption" />
                <xsl:value-of select="@desc" />
                <xsl:apply-templates select="desc" />
                </td>
5              </tr>
                </table>
                </td>
                <xsl:if expr="notPreviewOutput(this)">
                <script language="JavaScript1.1">
10              if (navigator.appName == "Netscape")
                <xsl:eval no-entities="t">NBSP()</xsl:eval>
                </script>
                </xsl:if>
                </xsl:when>
15              <xsl:otherwise>
                <xsl:if expr="notPreviewOutput(this)">
                <script language="JavaScript1.1">
                if (navigator.appName == "Netscape")
                <xsl:eval no-entities="t">NBSP()</xsl:eval>
20              </script>
                </xsl:if>
                <td valign="top">
                <xsl:attribute name="style">border-left-style: solid; border-left-width: 1; border-
                left-color:black</xsl:attribute>
25              <table border="0" cellpadding="2" cellspacing="0" align="center"
        width="120">
                <tr>
                <td valign="top" align="center">
                <xsl:attribute name="height">
30              <xsl:eval>gMaxHeight + 20</xsl:eval>
                </xsl:attribute>
                <a>
                <xsl:attribute name="href">
                <xsl:value-of select="@file-href" />
35              </xsl:attribute>
                <img border="0" vspace="5" hspace="12">
                <xsl:attribute name="src">
                <xsl:value-of select="@thumb-href" />
                </xsl:attribute>
40              <xsl:attribute name="width">
                <xsl:value-of select="@thumbwidth" />
                </xsl:attribute>
```

```
            <xsl:attribute name="height">
            <xsl:value-of select="@thumbheight" />
            </xsl:attribute>
            <xsl:attribute name="title">
            <xsl:value-of select="@caption" />
            </xsl:attribute>
            </img>
            </a>
            </td>
            </tr>
            <tr>
            <td valign="top">
            <xsl:apply-templates select="caption" />
            <xsl:value-of select="@desc" />
            <xsl:apply-templates select="desc" />
            </td>
            </tr>
            </table>
            </td>
            </xsl:otherwise>
            </xsl:choose>
            </xsl:template>
            <xsl:template match="caption | desc">
            <xsl:apply-templates />
            </xsl:template>
            </xsl:stylesheet>
```

Sample 5: Montage XLS Template

```
            xsl:stylesheet xmlns:xsl="http://www.w3.org/TR/WD-xsl">
            <xsl:script>
            <![CDATA[
                    //generate a random int to identify the functions and objects in this gallery
                    var rnd = Math.round(Math.random() * 10000);
                    function breakRow(e) {
                            var     numPerRow =
            e.selectSingleNode("//options").getAttribute("numperrow");
                            var index = absoluteChildNumber(e);
                            // first image needs a new row
                            if (index == 1)
                            {
                                    return true;
                            }
```

```
                        else{
                                // 3, 4, 4 pattern
                                var remainder = index % 11;
                                if (remainder == 1 || remainder == 4 || remainder == 8)
                                        return true;
                                else
                                        return false;
                        }
                }
        function notPreviewOutput(e) {
                        if (e.selectSingleNode("/xml[@output='preview']")) {
                                return false;
                        } else {
                                return true;
                        }
                } function getAlignment(e) {
                        var numPerRow =
parseInt(e.selectSingleNode("//options").getAttribute("numperrow"));
                        var childNum = absoluteChildNumber(e);

//find the child number of the first image in the last row
                        var pict = e.selectNodes("//picture").length;
                        var index = pict % 11;
                        if (index >= 8)
                                pict = pict - index + 8;
                        else if (index >= 4 )
                                pict = pict - index + 4;
                        else if (index > 0)
                                pict = pict - index;
                        else
                                pict = pict - 3;

//return alignment based on where the image falls in the table
                        if (childNum < numPerRow) {
                                /* first row */
                                return "bottom";
                        } else if (childNum >= pict) {
                                /* last row */
                                return "top";
                        } else {
```

```
                        /* all other rows */
                        return "middle";
                    }
                }
            ]]>
            </xsl:script>
            <!--
                the template block describes this template.
                this info is used by FP when building the photo galery dialog
            -->
            <template>
                <title>
                    -<!--
                    _locID_text="Title"
                    -->
                    Montage Layout
                </title>
                <description>
                    -<!--
                    _locID_text="Description"
                    -->
                    - Thumbnail images of your images are created automatically. - Thumbnail
images are displayed in a pattern like a collage. - Caption text appears when you rest the
pointer on the image. - Descriptive text is not available with this layout.
                </description>
                <defaults imgPerRow="4" thumbWidth="100" />
                <dependent-files />
            </template>
            <xsl:template>
                <xsl:copy>
                    <xsl:apply-templates select="@* | * | comment() | pi() | text()" />
                </xsl:copy>
            </xsl:template>
            <xsl:template match="/">
                <xsl:apply-templates select="xml" />
            </xsl:template>
            -<!--
                this template has identical Preview and Real output
            -->
            <xsl:template match="xml[@output != 'subpage']">
                <html>
                    <head>
```

```
                    <meta http-equiv="Content-Type" content="text/html; charset=utf-8" />
                    <title>
                    <xsl:value-of select="//options/@pageName" />
                    </title>
5                   </head>
                    <body>
                    <xsl:if expr="notPreviewOutput(this)">
                    <picture file-href="real_p.htm" />
                    <picture file-href="real_x.htm" />
10                  </xsl:if>
                    <table border="0" cellspacing="0" cellpadding="0">
                    <xsl:attribute name="id">
                    fpGalleryTable_
                    <xsl:eval>rnd</xsl:eval>
15                  </xsl:attribute>
                    <xsl:apply-templates select="//pictures" />
                    </table>
                    </body>
                    </html>
20                  </xsl:template>
                    - <!--
                    this is the output we generate for each sub page of the gallery
                    -->
                    <xsl:template match="xml[@output='subpage']">
25                  <html>
                    <head>
                    <meta http-equiv="Content-Type" content="text/html; charset=utf-8" />
                    <title>
                    <xsl:value-of select="//picture/caption" />
30                  </title>
                    </head>
                    <body>
                    <div align="center">
                    <table width="100%" align="center">
35                  <tr>
                    <td width="100%" align="center" colspan="3">
                    <img hspace="10" border="0">
                    <xsl:attribute name="width">
                    <xsl:value-of select="//picture/@filewidth" />
40                  </xsl:attribute>
                    <xsl:attribute name="height">
                    <xsl:value-of select="//picture/@fileheight" />
```

```
</xsl:attribute>
<xsl:attribute name="src">
<xsl:value-of select="//picture/@file-href" />
</xsl:attribute>
<xsl:attribute name="title">
<xsl:value-of select="//picture/caption" />
</xsl:attribute>
</img>
</td>
</tr>
<tr>
<td colspan="3">
<xsl:apply-templates select="//picture/caption" />
</td>
</tr>
<tr>
<td colspan="3">
<xsl:apply-templates select="//picture/desc" />
</td>
</tr>
<tr>
<td>
<a>
<xsl:attribute name="href">
<xsl:value-of select="//picture/@prevImgPath" />
</xsl:attribute>
-<!--
_locID_text="PrevImg"
-->
Previous Image
</a>
</td>
<td>
<a>
<xsl:attribute name="href">
<xsl:value-of select="//picture/@galleryPath" />
</xsl:attribute>
-<!--
_locID_text="BackGal"
-->
Back To Gallery
</a>
```

```
                </td>
                <td>
                <a>
                <xsl:attribute name="href">
 5              <xsl:value-of select="//picture/@nextImgPath" />
                </xsl:attribute>
                -<!--
                _locID_text="NextImg"
                -->
10              Next Image
                </a>
                </td>
                </tr>
                </table>
15              </div>
                </body>
                </html>
                </xsl:template>
                <xsl:template match="pictures">
20              <xsl:apply-templates />
                </xsl:template>
                <xsl:template match="picture">
                <xsl:if expr="breakRow(this)">
                <tr />
25              <td align="center" valign="top" nowrap="" />
                </xsl:if>
                <a>
                <xsl:attribute name="href">
                <xsl:value-of select="@file-href" />
30              </xsl:attribute>
                <img border="0" vspace="5" hspace="5">
                <xsl:attribute name="src">
                <xsl:value-of select="@thumb-href" />
                </xsl:attribute>
35              <xsl:attribute name="width">
                <xsl:value-of select="@thumbwidth" />
                </xsl:attribute>
                <xsl:attribute name="height">
                <xsl:value-of select="@thumbheight" />
40              </xsl:attribute>
                <xsl:attribute name="title">
                <xsl:eval>this.selectSingleNode("caption").text</xsl:eval>
```

```
</xsl:attribute>
<xsl:attribute name="align">
<xsl:eval>getAlignment(this)</xsl:eval>
</xsl:attribute>
</img>
</a>
</xsl:template>
</xsl:stylesheet>
```

Sample 6: Slide Show XLS Template
```
<?xml version="1.0" ?>
<xsl:stylesheet xmlns:xsl="http://www.w3.org/TR/WD-xsl">
<xsl:script>
<![CDATA[
        //generate a random int to identify the functions and objects in this gallery
        var rnd = Math.round(Math.random() * 10000);
        var rnd2 = rnd;
        var TRAY_WIDTH = 640;
        function getRandom() {
                rnd2 = Math.round(Math.random() * 10000);
                return rnd2;
        }
        function notEmpty(e) {
                var childList = e.selectSingleNode("//pictures").childNodes;
                if (childList.length > 0)
                        return true;
                else
                        return false;
        }
        function getHeight(e) {
                var childList = e.selectSingleNode("//pictures").childNodes;
                var maxHeight = 0;
                var iHeight = 0;
                for (var i=0;i<childList.length;i++) {
                  iHeight = parseInt(childList[i].getAttribute("thumbheight"))
                   if ( iHeight > maxHeight) maxHeight = iHeight;
                }
                return maxHeight;
        }
        function disableRight(e) {
                var childList = e.selectNodes("//picture");
                var iWidth = 20;
```

```
                    for (i=0;i<childList.length;i++) {
                        iWidth +=
       parseInt(childList[i].getAttribute("thumbwidth")) + 20;
                    }
                    if (iWidth > getWidth(e))
                        return false;
                    return true;
                }
                function previewImgChk(e) {
                    //always return true if we're not generating a preview
                    if (!e.selectSingleNode("/xml[@output='preview']")) return true;

//figure out the most thumbnail images we can show in the space
       defined by TRAY_WIDTH
                    var childList = e.selectNodes("//picture");
                    var iWidth = 20;
                    for (i=0;i<childList.length;i++) {
                        iWidth +=
       parseInt(childList[i].getAttribute("thumbwidth")) + 20;
                        if (iWidth > TRAY_WIDTH) {
                            break;
                        }
                    }
                    // return false if this element is above that number
                    if (childNumber(e) <= i) {
                        return true;
                    } else {
                        return false;
                    }
                }
                function getWidth(e) {
                    //figure out the most thumbnail images we can show in the space
       defined by TRAY_WIDTH
                    var childList = e.selectNodes("//picture");
                    var iWidth = 20;
                    for (i=0;i<childList.length;i++) {
                        iWidth +=
       parseInt(childList[i].getAttribute("thumbwidth")) + 20;
                        if (iWidth > TRAY_WIDTH) {
                            return iWidth -
       parseInt(childList[i].getAttribute("thumbwidth")) - 20;
                        }
                    }
                }
```

```
                    return iWidth;
            } function isPreviewOutput(e) {
            if (e.selectSingleNode("/xml[@output='preview']")) {
                    return true;
            } else {
                    return false;
            }
    }
]]>
</xsl:script>
<!--
    the template block describes this template.
    this info is used by FP when building the photo gallery dialog
-->
<template>
<title>
- <!--
_locID_text="Title"
-->
Slide Show
</title>
<description>
- <!--
_locID_text="Description"
-->
- Thumbnail images of your images are created automatically. - Thumbnail images are arranged in a row that scrolls across the top. - The selected image is displayed full-size in the center. - Descriptive text is placed below the full-size image.
</description>
<defaults imgPerRow="2" thumbWidth="100" />
<dependent-files>
<file name="scripts" path="sldshow.js" />
<file name="prev" path="prev.gif" />
<file name="next" path="next.gif" />
<file name="prevdis" path="prevdis.gif" />
<file name="nextdis" path="nextdis.gif" />
</dependent-files>
</template>
<xsl:template>
```

```
<xsl:copy>
<xsl:apply-templates select="@* | * | comment() | pi() | text()" />
</xsl:copy>
</xsl:template>
<xsl:template match="/">
<xsl:apply-templates select="xml" />
</xsl:template>
-<!--
this is the preview HTML we generate for display inside FP
-->
<xsl:template match="xml[@output = 'preview']">
<html>
<head>
<meta http-equiv="Content-Type" content="text/html; charset=utf-8" />
<title>
<xsl:value-of select="//options/@pageName" />
</title>
</head>
<body>
<div align="center">
<center>
<table border="0" cellspacing="0" cellpadding="5" width="700">
<tr>
<td nowrap="" align="center">
<img border="0" align="middle">
<xsl:attribute name="src">
<xsl:value-of select="//dependent-files/file[@name='prevdis']/@path" />
</xsl:attribute>
</img>
<xsl:for-each select="//pictures">
<xsl:apply-templates select="picture" />
</xsl:for-each>
<img border="0" align="middle">
<xsl:attribute name="src">
<xsl:value-of select="//dependent-files/file[@name='nextdis']/@path" />
</xsl:attribute>
</img>
<hr style="height:1" />
</td>
</tr>
</table>
<xsl:if expr="notEmpty(this)">
```

```xml
<img>
<xsl:attribute name="width">
<xsl:value-of select="//pictures/picture[0]/@filewidth" />
</xsl:attribute>
<xsl:attribute name="height">
<xsl:value-of select="//pictures/picture[0]/@fileheight" />
</xsl:attribute>
<xsl:attribute name="src">
<xsl:value-of select="//pictures/picture[0]/@file-href" />
</xsl:attribute>
</img>
</xsl:if>
<div>
<xsl:apply-templates select="//pictures/picture[0]/caption" />
</div>
<div>
<xsl:apply-templates select="//pictures/picture[0]/desc" />
</div>
</center>
</div>
</body>
</html>
</xsl:template>
<!--
this is what gets generated for the actual gallery
-->
<xsl:template match="xml[@output = 'real']">
<html>
<head>
<meta http-equiv="Content-Type" content="text/html; charset=utf-8" />
<title>
<xsl:value-of select="//options/@pageName" />
</title>
</head>
<body>
<picture file-href="real_p.htm" />
<picture file-href="real_x.htm" />
<div align="center">
<center>
<layer visibility="hide">
<div style="display:none;">
<xsl:attribute name="id">
```

```
                    fpGalleryCaptions_
                    <xsl:eval>rnd</xsl:eval>
                    </xsl:attribute>
                    <xsl:for-each select="//caption">
 5                  <div>
                    <xsl:apply-templates />
                    </div>
                    </xsl:for-each>
                    </div>
10                  <div style="display:none;">
                    <xsl:attribute name="id">
                    fpGalleryDescriptions_
                    <xsl:eval>rnd</xsl:eval>
                    </xsl:attribute>
15                  <xsl:for-each select="//desc">
                    <div>
                    <xsl:apply-templates />
                    </div>
                    </xsl:for-each>
20                  </div>
                    </layer>
                    <script language="javascript">
                    <xsl:attribute name="src">
                    <xsl:value-of select="//dependent-files/file[@name='scripts']/@path" />
25                  </xsl:attribute>
                    <xsl:comment />
                    </script>
                    <table border="0" cellspacing="0" cellpadding="5" width="700">
                    <tr>
30                  <td nowrap="" align="center">
                    <layer visibility="hide">
                    <img border="0" align="middle">
                    <xsl:attribute name="src">
                    <xsl:value-of select="//dependent-files/file[@name='prevdis']/@path" />
35                  </xsl:attribute>
                    <xsl:attribute name="lowsrc">
                    <xsl:value-of select="//dependent-files/file[@name='prev']/@path" />
                    </xsl:attribute>
                    <xsl:attribute name="id">
40                  fpGalleryLeftBtn_
                    <xsl:eval>rnd</xsl:eval>
                    </xsl:attribute>
```

```
         <xsl:attribute name="onclick">
         JavaScript1.1:fp_ScrollLeft(
         <xsl:eval>rnd</xsl:eval>
         )
 5       </xsl:attribute>
         </img>
         </layer>
         <script language="JavaScript1.1">
         <xsl:comment>
10       if (fp_ie4()) { document.write("<span align='center' style='width:
         <xsl:eval>getWidth(this)</xsl:eval>
         ;overflow:hidden' id='fpGalleryListCell_
         <xsl:eval>rnd</xsl:eval>
         >"); }
15       </xsl:comment>
         </script>
         <xsl:for-each select="//pictures">
         <xsl:apply-templates />
         </xsl:for-each>
20       <span>
         <xsl:attribute name="style">
         width:0;height:
         <xsl:eval>getHeight(this)</xsl:eval>
         ;visibility:hidden
25       </xsl:attribute>
         .
         </span>
         <script language="JavaScript1.1">
         <xsl:comment>if (fp_ie4()) { document.write("</span>"); }</xsl:comment>
30       </script>
         <layer visibility="hide">
         <xsl:choose>
         <xsl:when expr="disableRight(this)">
         <img border="0" align="middle">
35       <xsl:attribute name="src">
         <xsl:value-of select="//dependent-files/file[@name='nextdis']/@path" />
         </xsl:attribute>
         <xsl:attribute name="lowsrc">
         <xsl:value-of select="//dependent-files/file[@name='next']/@path" />
40       </xsl:attribute>
         <xsl:attribute name="id">
         fpGalleryRightBtn_
```

```
<xsl:eval>rnd</xsl:eval>
</xsl:attribute>
<xsl:attribute name="onclick">
JavaScript1.1:fp_ScrollRight(
<xsl:eval>rnd</xsl:eval>
)
</xsl:attribute>
</img>
</xsl:when>
<xsl:otherwise>
<img border="0" align="middle">
<xsl:attribute name="src">
<xsl:value-of select="//dependent-files/file[@name='next']/@path" />
</xsl:attribute>
<xsl:attribute name="lowsrc">
<xsl:value-of select="//dependent-files/file[@name='nextdis']/@path" />
</xsl:attribute>
<xsl:attribute name="id">
fpGalleryRightBtn_
<xsl:eval>rnd</xsl:eval>
</xsl:attribute>
<xsl:attribute name="onclick">
JavaScript1.1:fp_ScrollRight(
<xsl:eval>rnd</xsl:eval>
)
</xsl:attribute>
</img>
<script language="JavaScript1.1">
rightdisabled = false length =
<xsl:eval>getWidth(this)</xsl:eval>
</script>
</xsl:otherwise>
</xsl:choose>
</layer>
<hr style="height:1" />
</td>
</tr>
</table>
<img>
<xsl:attribute name="id">
fpGalleryMainImg_
<xsl:eval>rnd</xsl:eval>
```

```
        </xsl:attribute>
        <xsl:attribute name="name">
        fpGalleryMainImg_
        <xsl:eval>rnd</xsl:eval>
 5      </xsl:attribute>
        <xsl:attribute name="width">
        <xsl:value-of select="//pictures/picture[0]/@filewidth" />
        </xsl:attribute>
        <xsl:attribute name="height">
10      <xsl:value-of select="//pictures/picture[0]/@fileheight" />
        </xsl:attribute>
        <xsl:attribute name="src">
        <xsl:value-of select="//pictures/picture[0]/@file-href" />
        </xsl:attribute>
15      <xsl:attribute name="title">
        <xsl:value-of select="//pictures/picture[0]/caption" />
        </xsl:attribute>
        </img>
        <layer visibility="hide">
20      <div>
        <xsl:attribute name="id">
        fpGalleryCaptionCell_
        <xsl:eval>rnd</xsl:eval>
        </xsl:attribute>
25      <xsl:apply-templates select="//pictures/picture[0]/caption" />
        </div>
        <div>
        <xsl:attribute name="id">
        fpGalleryDescCell_
30      <xsl:eval>rnd</xsl:eval>
        </xsl:attribute>
        <xsl:apply-templates select="//pictures/picture[0]/desc" />
        </div>
        </layer>
35      </center>
        </div>
        </body>
        </html>
        </xsl:template>
40      -<!--
        this is the output we generate for each sub page of the gallery
        -->
```

```
    <xsl:template match="xml[@output='subpage']">
    <html>
    <head>
    <title>
5   <xsl:value-of select="//picture/caption" />
    </title>
    </head>
    <body>
    <div align="center">
10  <table width="100%" align="center">
    <tr>
    <td width="100%" align="center" colspan="3">
    <img hspace="10" border="0">
    <xsl:attribute name="width">
15  <xsl:value-of select="//picture/@filewidth" />
    </xsl:attribute>
    <xsl:attribute name="height">
    <xsl:value-of select="//picture/@fileheight" />
    </xsl:attribute>
20  <xsl:attribute name="src">
    <xsl:value-of select="//picture/@file-href" />
    </xsl:attribute>
    <xsl:attribute name="title">
    <xsl:value-of select="//picture/caption" />
25  </xsl:attribute>
    </img>
    </td>
    </tr>
    <tr>
30  <td colspan="3">
    <xsl:apply-templates select="//picture/caption" />
    </td>
    </tr>
    <tr>
35  <td colspan="3">
    <xsl:apply-templates select="//picture/desc" />
    </td>
    </tr>
    <tr>
40  <td>
    <a>
    <xsl:attribute name="href">
```

```
<xsl:value-of select="//picture/@prevImgPath" />
</xsl:attribute>
-<!--
_locID_text="PrevImg"
-->
Previous Image
</a>
</td>
<td>
<a>
<xsl:attribute name="href">
<xsl:value-of select="//picture/@galleryPath" />
</xsl:attribute>
-<!--
_locID_text="BackGal"
-->
Back To Gallery
</a>
</td>
<td>
<a>
<xsl:attribute name="href">
<xsl:value-of select="//picture/@nextImgPath" />
</xsl:attribute>
-<!--
_locID_text="NextImg"
-->
Next Image
</a>
</td>
</tr>
</table>
</div>
</body>
</html>
</xsl:template>
<xsl:template match="picture">
<xsl:if expr="previewImgChk(this)">
<xsl:choose>
<xsl:when expr="isPreviewOutput(this)">
<img hspace="10" vspace="5" border="0">
<xsl:attribute name="src">
```

```
        <xsl:value-of select="@thumb-href" />
        </xsl:attribute>
        <xsl:attribute name="width">
        <xsl:value-of select="@thumbwidth" />
5       </xsl:attribute>
        <xsl:attribute name="height">
        <xsl:value-of select="@thumbheight" />
        </xsl:attribute>
        <xsl:attribute name="title">
10      <xsl:value-of select="./caption" />
        </xsl:attribute>
        <xsl:attribute name="align">absmiddle</xsl:attribute>
        </img>
        </xsl:when>
15      <xsl:otherwise>
        <a target="_self">
        <xsl:attribute name="href">
        Javascript:fp_ShowImg(document['fpphoto_
        <xsl:eval>getRandom()</xsl:eval>
20      '],'
        <xsl:value-of select="@filewidth" />
        ',' 
        <xsl:value-of select="@fileheight" />
        ','
25      <xsl:eval>rnd</xsl:eval>
        ',
        <xsl:eval>childNumber(this) - 1</xsl:eval>
        );
        </xsl:attribute>
30      <img hspace="10" vspace="5" border="0">
        <xsl:attribute name="src">
        <xsl:value-of select="@thumb-href" />
        </xsl:attribute>
        <xsl:attribute name="id">
35      fpphoto_
        <xsl:eval>rnd2</xsl:eval>
        </xsl:attribute>
        <xsl:attribute name="name">
        fpphoto_
40      <xsl:eval>rnd2</xsl:eval>
        </xsl:attribute>
        <xsl:attribute name="lowsrc">
```

```
                <xsl:value-of select="@file-href" />
            </xsl:attribute>
            <xsl:attribute name="width">
                <xsl:value-of select="@thumbwidth" />
            </xsl:attribute>
            <xsl:attribute name="height">
                <xsl:value-of select="@thumbheight" />
            </xsl:attribute>
            <xsl:attribute name="title">
                <xsl:value-of select="./caption" />
            </xsl:attribute>
            <xsl:attribute name="align">absmiddle</xsl:attribute>
        </img>
        </a>
    </xsl:otherwise>
</xsl:choose>
</xsl:if>
</xsl:template>
<xsl:template match="caption | desc">
    <xsl:apply-templates />
</xsl:template>
</xsl:stylesheet>
```

Sample 6: Vertical XLS Template

```
<?xml version="1.0" ?>
<xsl:stylesheet xmlns:xsl="http://www.w3.org/TR/WD-xsl">
<xsl:script>
<![CDATA[
    //generate a random int to identify the functions and objects in this gallery
    var rnd = Math.round(Math.random() * 10000);
    var gnumPerRow = ""
    var count = ""
function breakRow(e) {
    if (gnumPerRow == "") {
        gnumPerRow = e.selectSingleNode("//options").getAttribute("numperrow");
    }
    return ((absoluteChildNumber(e) - 1)%gnumPerRow) == 0;
}
function isPreviewOutput(e) {
    if (e.selectSingleNode("/xml[@output='preview']")) {
        return true;
```

```
            } else {
                    return false;
            }
    }
    function isLastCell(e) {
            if (count == "") {
                    count = e.selectNodes("//picture").length;
            }
            return (count == absoluteChildNumber(e));
    }
    function HR()
    {
            return "document.write(\"<hr noshade="
    style='height:1;color:black'>\");";
    }
      function FillTableEnd(e) {
            if (gnumPerRow == "") {
                    gnumPerRow =
    e.selectSingleNode("//options").getAttribute("numperrow");
            }
            if (count == "") {
                    count = e.selectNodes("//picture").length;
            }
            var index = count % gnumPerRow;
            var html = "";
            var i = 0;
            if (index == 0)
            {
                    index = gnumPerRow;
            }
            // only do that for more than one row situation.
            if (count > gnumPerRow)
            {
                    for(i=0; i<gnumPerRow - index; i++)
                    {
                            if (isPreviewOutput(e))
                            {
                                    html +="<td valign=\"top\"> \n\
                                    <table border=\"0\" cellpadding=\"0\"
cellspacing=\"0\" width=\"100%\">\n\
                                    <tr> \n\
```

```
                                              <td colspan=\"2\" height=\"1\"
     style=\"border-top-style: solid; border-top-width: 1; border-top-color:black\">\n\
                                              </td>\n\
                                              <td width=\"10\"><font
5    color=\"white\"> </font></td>\n\
                                      </tr>\n\
                                  </table></td>\n";
                          }
                          else{
10                            html +="<td valign=\"top\"> \n\
                                  <table border=\"0\" cellpadding=\"0\"
     cellspacing=\"0\" width=\"100%\">\n\
                                      <tr> \n\
                                          <td colspan=\"2\" height=\"1\"
15   width=\"95%\">\n\
                                              <script
     language=\"JavaScript1.1\">\n\
                                                  document.write(\"<hr
     noshade=" style='height:1;color:black'>\");\n\
20                                            </script>\n\
                                          </td>\n\
                                          <td width=\"10\"><font
     color=\"white\"> </font></td>\n\
                                      </tr>\n\
25                                </table></td>\n";
                          }
                      }
                  }
                  html += "\n<tr>\n";
30                for(i=0; i<index; i++)
                  {
                      if (isPreviewOutput(e))
                      {
                          html +="<td valign=\"top\"> \n\
35                            <table border=\"0\" cellpadding=\"0\"
     cellspacing=\"0\" width=\"100%\">\n\
                                      <tr> \n\
                                          <td colspan=\"2\" height=\"1\"
     style=\"border-top-style: solid; border-top-width: 1; border-top-color:black\">\n\
40                                        </td>\n\
                                          <td width=\"10\"><font
     color=\"white\"> </font></td>\n\
```

```
                                        </tr>\n\
                                        </table></td>\n";
                            }
                            else{
                                html +="<td valign=\"top\"> \n\
                                        <table border=\"0\" cellpadding=\"0\" cellspacing=\"0\" width=\"100%\">\n\
                                        <tr> \n\
                                            <td colspan=\"2\" height=\"1\" width=\"95%\">\n\
                                                <script language=\"JavaScript1.1\">\n\
                                                    document.write(\"<hr noshade='' style='height:1;color:black'>\");\n\
                                                </script>\n\
                                            </td>\n\
                                            <td width=\"10\"><font color=\"white\"> </font></td>\n\
                                        </tr>\n\
                                        </table></td>\n";
                            }
                        }
                        html += "\n</tr>\n";
                        return html;
            }
            function lastTwoRow(e) {
                        if (gnumPerRow == "") {
                                    gnumPerRow = e.selectSingleNode("//options").getAttribute("numperrow");
                        }
                        if (count == "") {
                                    count = e.selectNodes("//picture").length;
                        }
                        var index = count % gnumPerRow;
                        return (count - absoluteChildNumber(e) - index < gnumPerRow);
            }
            function notLastRow(e) {
                        if (gnumPerRow == "") {
                                    gnumPerRow = e.selectSingleNode("//options").getAttribute("numperrow");
                        }
                        if (count == "") {
```

```
                        count = e.selectNodes("//picture").length;
                    }
                    var index = count % gnumPerRow;
                    return (count - absoluteChildNumber(e) >= index);
                }
            ]]>
            </xsl:script>
            <!--
                the template block describes this template.
                this info is used by FP when building the photo galery dialog
            -->
            <template>
            <title>
            -<!--
                _locID_text="Title"
            -->
            Vertical Layout
            </title>
            <description>
            -<!--
                _locID_text="Description"
            -->
            - Thumbnail images of your images are created automatically. - Thumbnail
    images are arranged in columns. - Descriptive text is placed to the right of the images.
            </description>
            <defaults imgPerRow="2" thumbWidth="100" />
            <dependent-files />
            </template>
            <xsl:template>
            <xsl:copy>
            <xsl:apply-templates select="@* | * | comment() | pi() | text()" />
            </xsl:copy>
            </xsl:template>
            <xsl:template match="/">
            <xsl:apply-templates select="xml" />
            </xsl:template>
            <xsl:template match="xml[@output !='subpage']">
            <html>
            <head>
            <meta http-equiv="Content-Type" content="text/html; charset=utf-8" />
            <title>
            <xsl:value-of select="//options/@pageName" />
```

```
                </title>
                </head>
                <body>
                <xsl:choose>
5               <xsl:when expr="isPreviewOutput(this)" />
                <xsl:otherwise>
                <picture file-href="real_p.htm" />
                <picture file-href="real_x.htm" />
                </xsl:otherwise>
10              </xsl:choose>
                <table border="0" cellspacing="0" cellpadding="0">
                <xsl:attribute name="id">
                fpGalleryTable_
                <xsl:eval>rnd</xsl:eval>
15              </xsl:attribute>
                <xsl:apply-templates select="//pictures" />
                </table>
                </body>
                </html>
20              </xsl:template>
                - <!--
                this is the output we generate for each sub page of the gallery
                -->
                <xsl:template match="xml[@output='subpage']">
25              <html>
                <head>
                <meta http-equiv="Content-Type" content="text/html; charset=utf-8" />
                <title>
                <xsl:value-of select="//picture/caption" />
30              </title>
                </head>
                <body>
                <div align="center">
                <table width="100%" align="center">
35              <tr>
                <td width="100%" align="center" colspan="3">
                <img hspace="10" border="0">
                <xsl:attribute name="width">
                <xsl:value-of select="//picture/@filewidth" />
40              </xsl:attribute>
                <xsl:attribute name="height">
                <xsl:value-of select="//picture/@fileheight" />
```

```
        </xsl:attribute>
        <xsl:attribute name="src">
        <xsl:value-of select="//picture/@file-href" />
        </xsl:attribute>
  5     <xsl:attribute name="title">
        <xsl:value-of select="//picture/caption" />
        </xsl:attribute>
        </img>
        </td>
 10     </tr>
        <tr>
        <td colspan="3">
        <xsl:apply-templates select="//picture/caption" />
        </td>
 15     </tr>
        <tr>
        <td colspan="3">
        <xsl:apply-templates select="//picture/desc" />
        </td>
 20     </tr>
        <tr>
        <td>
        <a>
        <xsl:attribute name="href">
 25     <xsl:value-of select="//picture/@prevImgPath" />
        </xsl:attribute>
        -<!--
        _locID_text="PrevImg"
        -->
 30     Previous Image
        </a>
        </td>
        <td>
        <a>
 35     <xsl:attribute name="href">
        <xsl:value-of select="//picture/@galleryPath" />
        </xsl:attribute>
        -<!--
        _locID_text="BackGal"
 40     -->
        Back To Gallery
        </a>
```

```
                </td>
                <td>
                <a>
                <xsl:attribute name="href">
 5              <xsl:value-of select="//picture/@nextImgPath" />
                </xsl:attribute>
                -<!--
                _locID_text="NextImg"
                -->
10              Next Image
                </a>
                </td>
                </tr>
                </table>
15              </div>
                </body>
                </html>
                </xsl:template>
                <xsl:template match="pictures">
20              <xsl:apply-templates />
                </xsl:template>
                <xsl:template match="picture">
                <xsl:if expr="breakRow(this)">
                <tr />
25              </xsl:if>
                <td valign="top">
                <table border="0" cellpadding="0" cellspacing="0" width="100%">
                <tr>
                <xsl:choose>
30              <xsl:when expr="isPreviewOutput(this)">
                <td colspan="2" height="1" style="border-top-style: solid; border-top-width: 1; border-top-color:black" />
                </xsl:when>
                <xsl:otherwise>
35              <td colspan="2" height="1">
                <script language="JavaScript1.1">
                <xsl:eval no-entities="t">HR()</xsl:eval>
                </script>
                </td>
40              </xsl:otherwise>
                </xsl:choose>
                <td width="10">
```

```
                <font color="white" />
                </td>
                </tr>
                <tr>
 5              <td valign="top">
                <a>
                <xsl:attribute name="href">
                <xsl:value-of select="@file-href" />
                </xsl:attribute>
10              <img border="0" vspace="10" hspace="10">
                <xsl:attribute name="src">
                <xsl:value-of select="@thumb-href" />
                </xsl:attribute>
                <xsl:attribute name="width">
15              <xsl:value-of select="@thumbwidth" />
                </xsl:attribute>
                <xsl:attribute name="height">
                <xsl:value-of select="@thumbheight" />
                </xsl:attribute>
20              <xsl:attribute name="title">
                <xsl:eval>this.selectSingleNode("caption").text</xsl:eval>
                </xsl:attribute>
                </img>
                </a>
25              </td>
                <td width="130" height="123" valign="top">
                <table width="130" border="0" cellspacing="0" cellpadding="0">
                <tr valign="top">
                <td height="10">
30              <font color="white" />
                </td>
                </tr>
                <tr valign="top">
                <td>
35              <xsl:apply-templates select="caption" />
                </td>
                </tr>
                <tr valign="top">
                <td>
40              <xsl:apply-templates select="desc" />
                </td>
                </tr>
```

```
        </table>
        </td>
        <td width="10">
        <font color="white" />
5       </td>
        </tr>
        </table>
        </td>
        <xsl:if expr="isLastCell(this)">
10      <xsl:eval no-entities="t">FillTableEnd(this)</xsl:eval>
        </xsl:if>
        </xsl:template>
        <xsl:template match="caption | desc">
        <xsl:apply-templates />
15      </xsl:template>
        </xsl:stylesheet>
```

Although the present invention has been described in connection with the preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling a user to automatically introduce a plurality of thumbnail images into a Web page to represent a plurality of original images, each thumbnail image having a size that is substantially smaller than each corresponding original image, comprising the steps of:
   (a) enabling the user to select the plurality of original images that are to be represented on the Web page by the plurality of thumbnail images;
   (b) producing a thumbnail image from each original image, by enabling the user to drag and drop an original image onto said Web page, and in response, automatically generating a corresponding thumbnail image for the original image;
   (c) determining a position of each thumbnail image on the Web page in accord with a format specified by a template;
   (d) automatically providing a hyperlink from each thumbnail image to each corresponding original image in the Web page; and
   (e) enabling the user to save the Web page which includes the plurality of thumbnail images and hyperlinks to the original images, each thumbnail image appearing in the position specified by the template when the Web page is displayed, selection of a thumbnail image and activation of a hyperlink associated with said thumbnail image causing the corresponding original image to be retrieved for display.

2. The method of claim 1, further comprising the step of enabling a user to select the template from among a plurality of templates, each of said plurality of templates defining a different format with which said plurality of thumbnail images will be displayed on said Web page.

3. The method of claim 2, wherein the plurality of templates include at least one of a vertically oriented template in which the thumbnail images are arrayed vertically, a horizontally oriented template in which the thumbnail images are arrayed horizontally, a slide show template, and a montage template.

4. The method of claim 2, further comprising the steps of:
   (a) enabling a user to define a custom template;
   (b) enabling a user to save said custom template; and
   (c) enabling a user to select said custom template to determine the format with which the plurality of thumbnail images are displayed on the Web page.

5. The method of claim 2, wherein each of the plurality of templates comprises an extensible style language file.

6. The method of claim 2, further comprising the steps of:
   (a) displaying a preview view of the Web page to a user; and
   (b) enabling a user to edit said Web page.

7. The method of claim 6, wherein the step of enabling a user to edit said Web page comprises the steps of:
   (a) enabling a user to select a different one of said plurality of templates than was previously selected;
   (b) automatically using said different one of the plurality of templates to generate an edited Web page that includes said plurality of thumbnail images, said plurality of thumbnail images being displayed according to formatting information provided by said different one of said plurality of templates;
   (c) displaying a preview of the edited Web page to a user; and
   (d) enabling a user to selectively perform at least one of the following:
      (i) continuing to edit said edited Web page; and
      (ii) saving the Web page that has been edited.

8. The method of claim 6, wherein the step of enabling a user to edit said Web page comprises at least one of the steps of:
   (a) enabling a user to select one of the plurality of thumbnail images to edit;
   (b) enabling a user to select one of the plurality of thumbnail images to delete; and
   (c) enabling a user to select at least one additional original image for which a corresponding thumbnail image and hyperlink will be automatically generated.

9. The method of claim 8, wherein the step of enabling a user to select one of the plurality of thumbnail images to edit comprises at least one of the steps of:
   (a) enabling a user to resize said thumbnail image that was selected;
   (b) enabling a user to crop said thumbnail image that was selected;
   (c) enabling a user to rotate said thumbnail image that was selected;
   (d) enabling a user to add a caption relating to said thumbnail image that was selected;
   (e) enabling a user to delete an existing caption relating to said thumbnail image that was selected;
   (f) enabling a user to modify an existing caption relating to said thumbnail image that was selected;
   (g) enabling a user to add a description relating to said thumbnail image that was selected;
   (h) enabling a user to delete an existing description relating to said thumbnail image that was selected; and
   (i) enabling a user to modify an existing description relating to said thumbnail image that was selected.

10. The method of claim 1, further comprising the step of employing at least one of a default number of thumbnail images per row of the template, a default height for each thumbnail image, a default width for each thumbnail image, a title of the template, a description of the template, and a preview image file name.

11. The method of claim 1, further comprising the steps of:
   (a) building a data manifest in extensible markup language that includes at least thumbnail data and hyperlink data;
   (b) loading an extensible style language file corresponding to the selected template; and
   (c) using said data manifest and said extensible style language file to generate a hypertext markup language (HTML) file defining said Web page.

12. The method of claim 11, wherein the step of building a data manifest comprises the steps of:
   (a) including within the data manifest a thumbnail image height attribute; and
   (b) including within the data manifest a thumbnail image width attribute.

13. The method of claim 12, wherein the step of building a data manifest further comprises at least one of the steps of:

(a) including within the data manifest a file attribute;
(b) including within the data manifest a caption element; and
(c) including within the data manifest a description element.

14. The method of claim 1, further comprising the steps of automatically generating a hyperlink between said corresponding thumbnail and the original image; and adding said corresponding thumbnail and said hyperlink on said Web page.

15. The method of claim 1, wherein the step of enabling a user to select the plurality of original images that are to be represented by the plurality of thumbnail images comprises at least one of the steps of:
(a) enabling a user to import a plurality of original images from at a storage;
(b) enabling a user to import a plurality of original images from a scanner; and
(c) enabling a user to import a plurality of original images from a digital image capturing device.

16. The method of claim 1, further comprising the step of enabling a user to link Web pages that include thumbnail images together.

17. The method of claim 16, wherein the step of enabling a user to link individual Web pages together comprises the step of enabling a user to add a navigation bar to each Web page to be linked together.

18. An article of manufacture adapted for use with a computer to enable a user to automatically introduce a plurality of thumbnail images into a Web page to represent a plurality of original images, each thumbnail image having a size that is substantially smaller than each corresponding original image, comprising:
(a) a memory medium; and
(b) a plurality of machine instructions stored on the memory medium, said plurality of machine instructions, when executed by a computer, causing the computer to:
(i) enable a user to select the plurality of original images that are to be represented on the Web page by the plurality of thumbnail images;
(ii) automatically produce a thumbnail image from each original image, by enabling the user to drag and drop an original image onto said Web page, and in response. automatically generate a corresponding thumbnail image for the original image;
(iii) determine a position of each thumbnail image on the Web page in accord with a format specified by a template;
(iv) automatically providing a hyperlink from each thumbnail image to each corresponding original image in the Web page; and
(v) enable a user to save the Web page, which includes the plurality of thumbnail images and hyperlinks to the original images, each thumbnail image appearing in the position specified by the template when the Web page is displayed, selection of a thumbnail image and activation of a hyperlink associated with said thumbnail image causing the corresponding original image to be retrieved for display.

19. The article of manufacture of claim 18, wherein said plurality of machine instructions further cause the computer to enable a user to select a template from among a plurality of templates, include at least one of a vertically oriented template in which the plurality of thumbnail image are arrayed vertically, a horizontally oriented template in which the plurality of thumbnail images are arrayed horizontally, a slide show oriented template, and a montage template.

20. The article of manufacture of claim 18, wherein when said plurality of machine instructions further cause the computer to:
(a) enable a user to define a custom template;
(b) enable a user to save said custom template; and
(c) enable a user to select said custom template to determine a format for positioning the plurality of thumbnail images on the Web page.

21. The article of manufacture of claim 18, wherein each of said plurality of templates comprises an extensible style language file.

22. The article of manufacture of claim 18, wherein each of the plurality of templates includes at least one of: a default number of thumbnail images per row of the template, a default height of each thumbnail image, a default width of each thumbnail image, a title of the template, a description of the template, and a preview image file name.

23. The article of manufacture of claim 18, wherein said plurality of machine instructions further cause the computer to:
(a) build a data manifest in extensible markup language that includes at least thumbnail image data and hyperlink data;
(b) load an extensible style language file corresponding to the selected the template; and
(c) use said data manifest and said extensible style language file corresponding to the selected the template to generate a hypertext markup language (HTML) file defining said Web page.

24. The article of manufacture of claim 23, wherein said plurality of machine instructions further cause the computer to:
(a) include within the data manifest a thumbnail image height attribute; and
(b) include within the data manifest a thumbnail image width attribute.

25. The article of manufacture of claim 24, wherein said plurality of machine instructions further cause the computer to implement at least one of the following:
(a) include within the data manifest a file attribute;
(b) include within the data manifest a caption element; and
(c) include within the data manifest a description element.

26. The article of manufacture of claim 18, wherein after said plurality of machine instructions further cause the computer to:
(a) display a preview of the Web page to a user; and
(b) enable a user to edit said Web page.

27. The article of manufacture of claim 26, wherein when said plurality of machine instructions cause the computer to enable a user to edit said Web page, said plurality of machine instructions further cause the computer to:
(a) enable a user to select a different one of said plurality of templates than was previously selected by the user to generate the Web page;
(b) automatically use the different template to generate an edited Web page that includes said plurality of thumbnail images displayed according to formatting information provided by said different template;
(c) display a preview of the edited Web page to a user; and
(d) enable a user to elect one of the following:
(i) continue to edit said edited Web page; and
(ii) save said edited Web page.

28. The article of manufacture of claim 26, wherein when said plurality of machine instructions cause the computer to enable a user to edit said Web page, said plurality of machine instructions further cause the computer to perform at least one of the following functions:
  (a) enable a user to select one of the plurality of thumbnail images to edit;
  (b) enable a user to select one of the plurality of thumbnail images to delete; and
  (c) enable a user to select at least one additional original image to include on said Web page, a corresponding thumbnail and a hyperlink between said corresponding thumbnail and each additional original image being automatically generated for each additional original image.

29. The article of manufacture of claim 28, wherein when said plurality of machine instructions cause the computer to enable a user to select said one of the plurality of thumbnail images to edit, said plurality of machine instructions further cause the computer to perform at least one of the following functions:
  (a) enable a user to resize said one of the plurality of thumbnail images;
  (b) enable a user to crop said one of the plurality of thumbnail images;
  (c) enable a user to rotate said one of the plurality of thumbnail images;
  (d) enable a user to add a caption relating to said one of the plurality of thumbnail images;
  (e) enable a user to delete an existing caption relating to said one of the plurality of thumbnail images;
  (f) enable a user to modify an existing caption relating to said one of the plurality of thumbnail images;
  (g) enabling a user to add a description relating to said one of the plurality of thumbnail images;
  (h) enabling a user to delete an existing description relating to said one of the plurality of thumbnail images; and
  (i) enabling a user to modify an existing description relating to said one of the plurality of thumbnail images.

30. The article of manufacture of claim 18, wherein when said plurality of machine instructions cause the computer to automatically produce a thumbnail image from each original image, said plurality of machine instructions further cause the computer to:
  (a) automatically generate a hyperlink between said corresponding thumbnail image and the original image; and
  (b) add said hyperlink and said corresponding thumbnail to said Web page.

31. The article of manufacture of claim 18, wherein when said plurality of machine instructions cause the computer to enable a user to select the plurality of original images that are to be represented by the plurality of thumbnail images, said plurality of machine instructions further cause the computer to:
  (a) enable a user to import a plurality of original images from a storage;
  (b) enable a user to import a plurality of original images from a scanner; and
  (c) enable a user to import a plurality of original images from a digital image capture device.

32. The article of manufacture of claim 18, wherein said plurality of machine instructions further cause the computer to enable a user to link individual Web pages together.

33. The article of manufacture of claim 32, wherein when said plurality of machine instructions cause the computer to enable a user to link individual Web pages together, said plurality of machine instructions further cause the computer to enable a user to add a navigation bar to each Web page to be linked together.

34. A system for enabling a user to automatically introduce a plurality of thumbnail images into a Web page to represent a plurality of original images, each thumbnail image having a size that is substantially smaller than each corresponding original image, said system comprising:
  (a) a memory for storing a plurality of machine instructions;
  (b) a display that displays text and images;
  (c) a user interface that enables a user to provide input to the system; and
  (d) a processor, coupled to the memory, the display, and the user interface, said processor executing the plurality of machine instructions, causing a plurality of functions to be implemented, said plurality of functions including:
    (i) enabling the user to select the plurality of original images that are to be represented on the Web page by the plurality of thumbnail images;
    (ii) producing a thumbnail image from each original image, by enabling a user to drag and drop an original image onto said Web page, and in response, automatically generating a corresponding thumbnail image for the original image;
    (iii) determining a position of each thumbnail image on the Web page in accord with a format specified by a template;
    (iv) automatically providing a hyperlink from each thumbnail image to each corresponding original image in the Web page; and
    (v) enabling the user to save the Web page, which includes the plurality of thumbnail images and hyperlinks to the original images, each thumbnail image appearing in the position specified by the template when the Web page is displayed, selection of a thumbnail image and activation of a hyperlink associated with said thumbnail image pausing the corresponding original image to be retrieved for display.

35. The system of claim 34, wherein the machine instructions cause the processor to prompt a user to select one template from among a plurality of different templates for determining a format and position of the plurality of thumbnail images in the Web page, the plurality of different templates including at least one of a vertically oriented template that arrays the thumbnail images vertically, a horizontally oriented template that arrays the plurality of thumbnail images horizontally, a slide show oriented template, and a montage template.

36. The system of claim 35, wherein the function of enabling a user to select said one template from among the plurality of templates comprises the functions of:
  (a) enabling a user to define a custom template;
  (b) enabling a user to save said custom template; and
  (c) including said custom template among the plurality of templates from which the user is enabled to select.

37. The system of claim 35, wherein each of the plurality of templates comprises an extensible style language file.

38. The system of claim 35, wherein each of the plurality of templates comprises at least one of: a default number of thumbnail images per row, a default height of each thumbnail image, a default width of each thumbnail image, a title of the template, a description of the template, and a preview image file name.

39. The system of claim 35, wherein the machine instructions further cause the processor to implement the functions of:
(a) displaying a preview of the Web page to a user; and
(b) enabling a user to edit said Web page.

40. The system of claim 39, wherein the function of enabling a user to edit said Web page includes the functions of:
(a) enabling a user to select a different one of said plurality of templates than was previously selected to produce the Web page;
(b) automatically using said different template to generate an edited Web page that includes said plurality of thumbnail images, said plurality of thumbnail images being displayed according to formatting information provided by said different template;
(c) displaying a preview of the edited Web page to a user; and
(d) enabling a user to selectively perform one of the following:
  (i) continuing to edit said edited Web page; and
  (ii) saving said edited Web page.

41. The system of claim 39, wherein the function of enabling a user to edit said Web page comprises at least one of the functions of:
(a) enabling a user to select one of the plurality of thumbnail images to edit;
(b) enabling a user to select one of the plurality of thumbnail images to edit; and
(c) enabling a user to select at least one additional original image to include on said Web page, a corresponding thumbnail for each additional original image and a hyperlink between said corresponding thumbnail and each additional original image being automatically generated, and said corresponding thumbnail being added to said Web page.

42. The system of claim 41, wherein the function of enabling a user to select one of the plurality of thumbnail images to edit comprises at least one of the functions of:
(a) enabling a user to resize one of the plurality of thumbnail images;
(b) enabling a user to crop one of the plurality of thumbnail images;
(c) enabling a user to rotate one of the plurality of thumbnail images;
(d) enabling a user to add a caption relating to one of the plurality of thumbnail images;
(e) enabling a user to delete an existing caption relating to one of the plurality of thumbnail images;
(f) enabling a user to modify an existing caption relating to one of the plurality of thumbnail images;
(g) enabling a user to add a description relating to one of the plurality of thumbnail images;
(h) enabling a user to delete an existing description relating to one of the plurality of thumbnail images; and
(i) enabling a user to modify an existing description relating to one of the plurality of thumbnail images.

43. The system of claim 34, wherein the function of using the template to generate a Web page comprises the functions of:
(a) building a data manifest in extensible markup language that includes at least thumbnail data and hyperlink data;
(b) loading an extensible style language file corresponding to the template; and
(c) using said data manifest and said extensible style language file to generate a hypertext markup language (HTML) file defining said Web page.

44. The system of claim 43, wherein the function of building a data manifest in extensible markup language comprises the functions of:
(a) including within the data manifest a thumbnail image height attribute; and
(b) including within the data manifest a thumbnail image width attribute.

45. The system of claim 44, wherein the function of building a data manifest in extensible markup language further comprises at least one of the functions of:
(a) including within the data manifest a file attribute;
(b) including within the data manifest a caption element; and
(c) including within the data manifest a description element.

46. The system of claim 34, wherein the function of automatically generating a hyperlink between said corresponding thumbnail and the original image, and adding said corresponding thumbnail and said hyperlink to said Web page.

47. The system of claim 34, wherein the function of enabling a user to select the plurality of original images that are to be represented by the plurality of thumbnail images comprises at least one of the functions of:
(a) enabling a user to import a plurality of original images from a storage to which the system is coupled;
(b) enabling a user to import a plurality of original images from a scanner to which the system is coupled; and
(c) enabling a user to import a plurality of original images from a digital image capture device to which the system is coupled.

48. The system of claim 34, wherein the machine instructions further cause the processor to implement the function of enabling a user to link individual Web pages together.

49. The system of claim 48, wherein the machine instructions further cause the processor to implement the function of enabling a user to add a navigation bar to each Web page to be linked together, thereby generating a Web site.

* * * * *

UNITED STATES PATENT AND TRADEMARK OFFICE
CERTIFICATE OF CORRECTION

| | |
|---|---|
| PATENT NO. | : 6,964,025 B2 |
| APPLICATION NO. | : 09/813515 |
| DATED | : November 8, 2005 |
| INVENTOR(S) | : Michael A. Angiulo et al. |

It is certified that error appears in the above-identified patent and that said Letters Patent is hereby corrected as shown below:

On the title page, item (75), under "Inventors", in column 1, line 3, delete "Zhenguang Chen" and insert -- Zhenguang Robert Chen --, therefor.

In column 8, line(s) 20-21, delete "http://www.w3.ord/TR/xmlschema-0/" and insert -- http://www.w3.org/TR/xmlschema-0/ --, therefor.

In column 10, line 32, delete "doubling" and insert -- double --, therefor.

In column 12, line 43, delete "particular" and insert -- particularly --, therefor.

In column 12, line 47, after "to" insert -- be --.

In column 14, line 39, after "image" insert -- . --.

In column 15, line 4, after "amount" insert -- of --.

In column 15, line 38, after "automatically" insert -- . --.

In column 16, line 22, delete "correspond" and insert -- corresponds --, therefor.

In column 16, line 63, delete "comers" and insert -- corners --, therefor.

In column 17, line 52, delete "the editing the" and insert -- editing the --, therefor.

In column 18, line 64, after "captions" insert -- . --.

In column 20, line 45, after "have to" delete "do".

In column(s) 93-94, line 10, delete "galery" and insert -- gallery --, therefor.

In column 106, line 10, in Claim 7, delete "(i)continuing" and insert -- (i) continuing --, therefor.

In column 106, line 11, in Claim 7, delete "(ii)saving" and insert -- (ii) saving --, therefor.

In column 107, line 16, in Claim 15, after "from" delete "at".

In column 107, line 46, in Claim 18, after "response" delete ".".

UNITED STATES PATENT AND TRADEMARK OFFICE
CERTIFICATE OF CORRECTION

PATENT NO. : 6,964,025 B2
APPLICATION NO. : 09/813515
DATED : November 8, 2005
INVENTOR(S) : Michael A. Angiulo et al.

It is certified that error appears in the above-identified patent and that said Letters Patent is hereby corrected as shown below:

In column 107, line 66, in Claim 19, delete "image" and insert -- images --, therefor.

In column 110, line 46, in Claim 34, delete "pausing" and insert -- causing --, therefor.

Signed and Sealed this

Twenty-second Day of September, 2009

David J. Kappos
*Director of the United States Patent and Trademark Office*